(12) United States Patent
Sasaki

(10) Patent No.: US 11,274,730 B2
(45) Date of Patent: Mar. 15, 2022

(54) STEP MOTOR AND INDICATOR INSTRUMENT FOR VEHICLE

(71) Applicant: DENSO CORPORATION, Kariya (JP)

(72) Inventor: Tatsuya Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 273 days.

(21) Appl. No.: 16/566,125

(22) Filed: Sep. 10, 2019

(65) Prior Publication Data

US 2020/0003278 A1 Jan. 2, 2020

Related U.S. Application Data

(63) Continuation of application No. PCT/JP2018/008211, filed on Mar. 5, 2018.

(30) Foreign Application Priority Data

Apr. 13, 2017 (JP) .............................. JP2017-079881

(51) Int. Cl.
| | | |
|---|---|---|
| *F16H 1/20* | (2006.01) | |
| *B60K 37/02* | (2006.01) | |
| *F16H 1/06* | (2006.01) | |
| *G01D 13/22* | (2006.01) | |
| *H02K 7/116* | (2006.01) | |
| *F16H 57/02* | (2012.01) | |

(52) U.S. Cl.
CPC ............... *F16H 1/20* (2013.01); *B60K 37/02* (2013.01); *F16H 1/06* (2013.01); *G01D 13/22* (2013.01); *H02K 7/116* (2013.01); *B60K 2370/698* (2019.05); *F16H 2057/02082* (2013.01)

(58) Field of Classification Search
CPC .... F16H 1/20; F16H 1/06; F16H 2057/02082; B60K 37/02; B60K 2370/698; G01D 13/22; H02K 7/116
See application file for complete search history.

(56) References Cited

U.S. PATENT DOCUMENTS

2015/0233462 A1\* 8/2015 Fukuda ............. F16H 57/02004
74/414
2017/0317554 A1\* 11/2017 Yokoyama ............. G01D 11/16

FOREIGN PATENT DOCUMENTS

| JP | 2001281361 A | 10/2001 |
|---|---|---|
| JP | 2003254797 A | 9/2003 |
| JP | 2010190748 A | 9/2010 |

(Continued)

*Primary Examiner* — Zakaria Elahmadi
(74) *Attorney, Agent, or Firm* — Harness, Dickey & Pierce, P.L.C.

(57) ABSTRACT

A step motor that rotationally drives a rotating body includes: an output gear having an output shaft that rotates around a rotation center line together with the rotating body, and a final gear extending radially outward from the output shaft; a radial bearing having an inner circumference side that radially supports the output shaft, on one side of the final gear in an axial direction; a reduction gear mechanism having a first reduction gear meshed with the final gear, and a second reduction gear meshed with the first reduction gear on the one side of the final gear in the axial direction; and a protrusion protruding from the radial bearing toward the other side in the axial direction, in a specific area extending from a longitudinal cross section of the output gear including the rotation center line to an opposite side away from the first reduction gear.

6 Claims, 24 Drawing Sheets

(56) References Cited

FOREIGN PATENT DOCUMENTS

| JP | 2011099826 A | 5/2011 |
| JP | 2015152157 A | 8/2015 |
| JP | 2016-101015 A | 5/2016 |

* cited by examiner

US 11,274,730 B2

STEP MOTOR AND INDICATOR INSTRUMENT FOR VEHICLE

CROSS REFERENCE TO RELATED APPLICATION

The present application is a continuation application of International Patent Application No. PCT/JP2018/008211 filed on Mar. 5, 2018, which designated the U.S. and claims the benefit of priority from Japanese Patent Application No. 2017-79881 filed on Apr. 13, 2017. The entire disclosures of all of the above applications are incorporated herein by reference.

TECHNICAL FIELD

The present disclosure relates to a step motor and an indicator instrument for a vehicle.

BACKGROUND ART

Conventionally, a step motor has been widely used for rotationally driving a rotating body. A rotation indicator indicating a vehicle state value is driven to rotate by a step motor as a rotating body.

SUMMARY

In one aspect of the present disclosure, a step motor that rotationally drives a rotating body includes:
an output gear having an output shaft that rotates around a rotation center line together with the rotating body, and a final gear extending radially outward from the output shaft;
a radial bearing having an inner circumference side that radially supports the output shaft, on one side of the final gear in an axial direction;
a reduction gear mechanism having a first reduction gear meshed with the final gear, and a second reduction gear meshed with the first reduction gear on the one side of the final gear in the axial direction; and
a protrusion protruding from the radial bearing toward the other side in the axial direction, in a specific area extending from a longitudinal cross section of the output gear including the rotation center line to an opposite side away from the first reduction gear.

DETAILED DESCRIPTION

Figure 24:
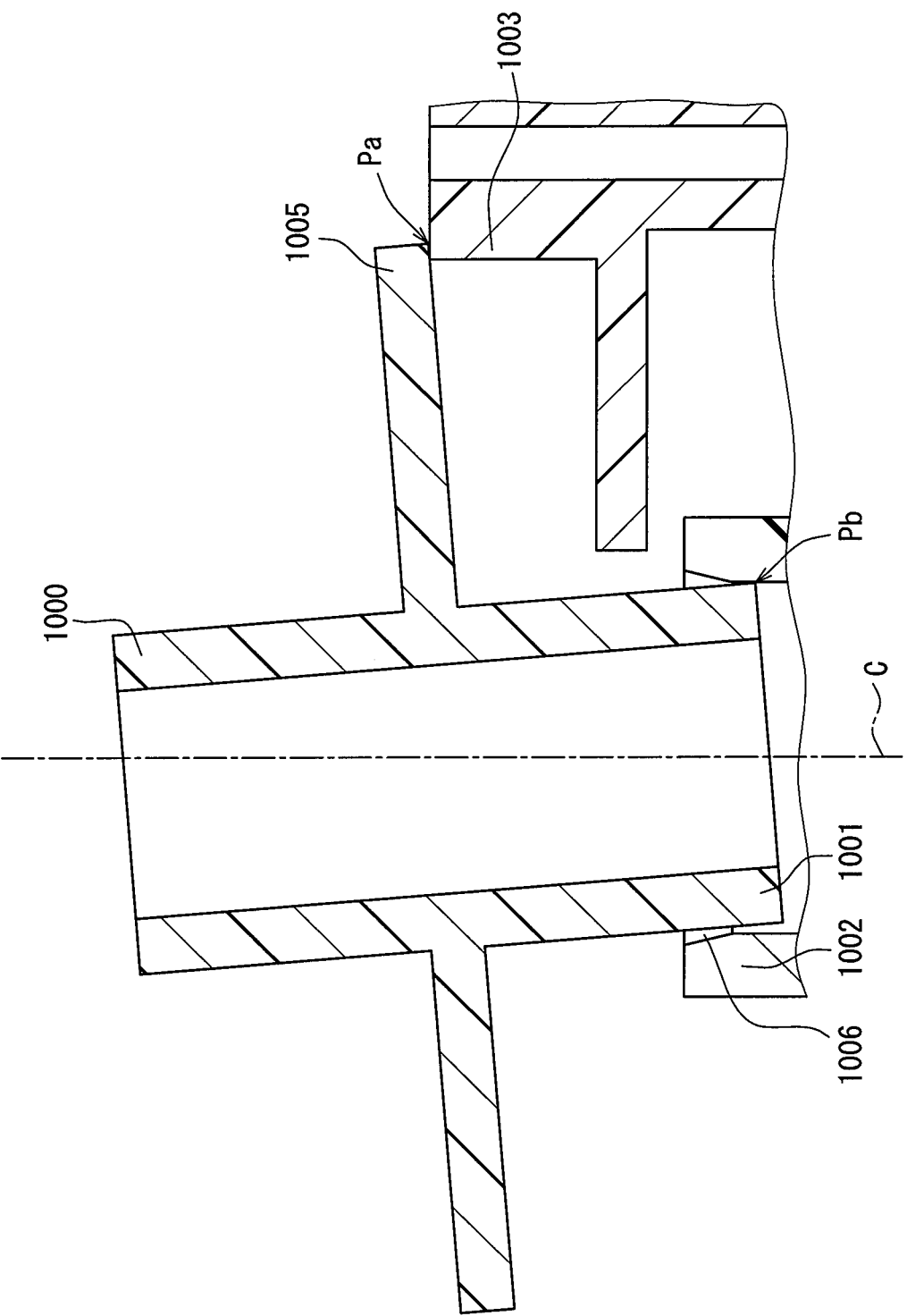
FIG. 24 is a cross-sectional view for explaining an issue to be solved.
Figure 25:
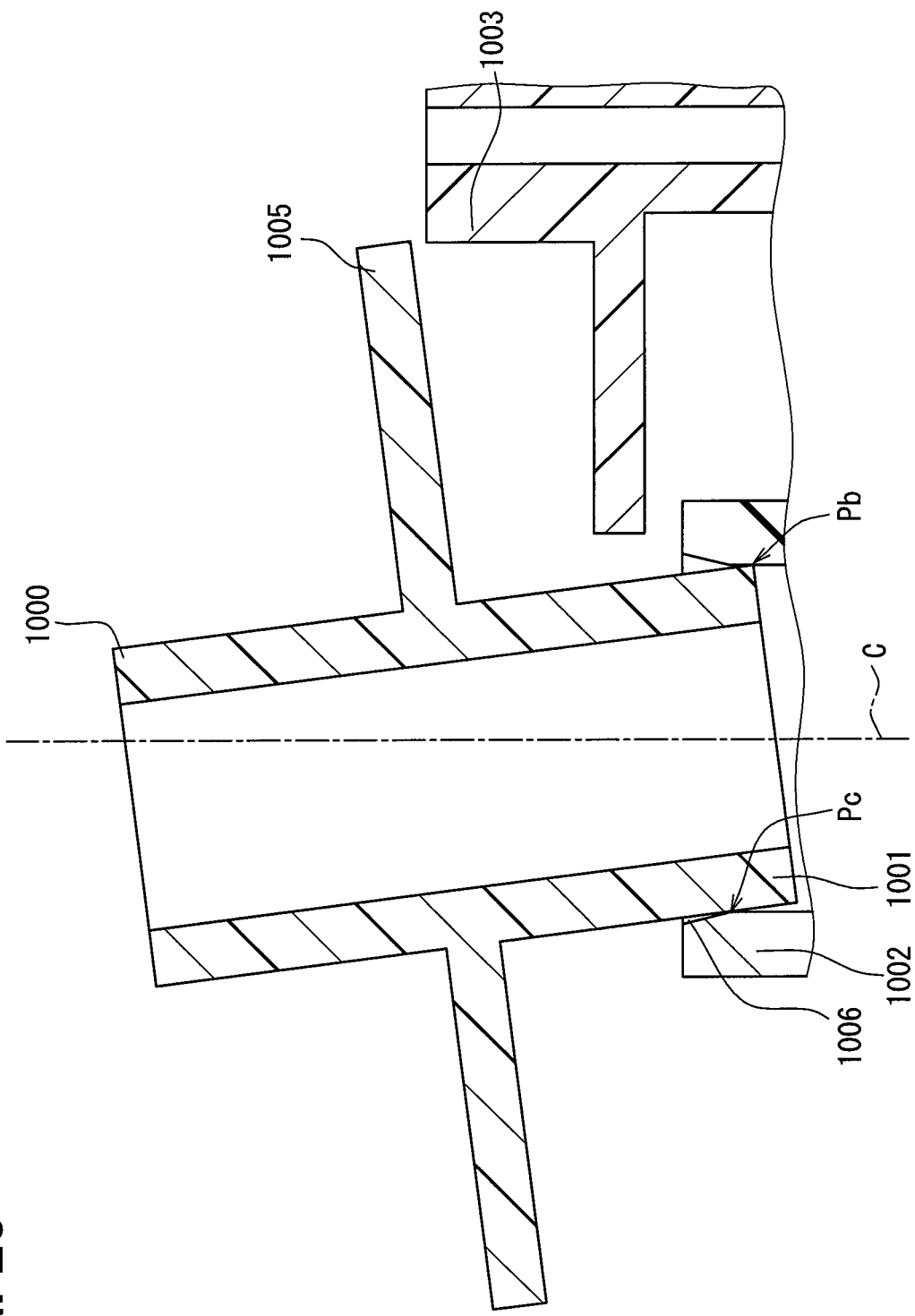
FIG. 25 is a cross-sectional view for explaining an issue to be solved.

To begin with, examples of relevant techniques will be described.
An output gear of a step motor has an output shaft radially supported by an inner peripheral side of a radial bearing, and a rotation indicator is rotatable around a rotation center line. The output gear has a final gear that extends radially outward from the output shaft, and plural reduction gears are directly or indirectly connected to the final gear to define a reduction gear mechanism. Accordingly, it is possible to reduce the surface pressure applied to the radial bearing, due to the radial load from the output shaft, while outputting a large rotational driving force from the output shaft to the rotating body.
A reduction gear engaged with the final gear meshes with another reduction gear on the opposite side of the radial bearing with respect to the final gear of the output gear in the axial direction. However, if the reduction gear engaged with the final gear is engaged with another reduction gear, on the side adjacent to the radial bearing in the axial direction, for example, to reduce the size, the following issues are found.
The issues are caused at the time of manufacture as schematically shown in FIGS. 24 and 25. Specifically, at the time of manufacturing, while inserting the output shaft 1001 of the output gear 1000 into the radial bearing 1002, the final gear 1005 of the output gear 1000 is to be engaged with one reduction gear 1003 of the pair of reduction gears geared in advance. However, in actuality, the final gear 1005 of the output gear 1000 is difficult to mesh with the reduction gear 1003 in the single insertion process. So, an assembly completion process is required to complete the meshing between the gears 1000, 1003, for example, by vibrating the step motor. As a result, there is a concern that the output gear 1000 may fall at the worst, since the output gear 1000 is too inclined from the original rotation center line C before the assembly completion process, in a state where the final gear 1005 rides on the reduction gear 1003. Such a falling causes a decrease in productivity, and is undesirable.

The cause of falling is explained. As shown in FIG. 24, when the support location Pa of the final gear 1005 by the reduction gear 1003 and the support location Pb of the output shaft 1001 by the radial bearing 1002 are offset from the original rotation center line C toward the reduction gear 1003, the output gear 1000 is in an unstable state supported at the two locations. Alternatively, as shown in FIG. 25, when the output shaft 1001 is supported by the radial bearing 1002 at two locations Pb and Pc opposite from each other through the original rotation center line C, the output gear 1000 is in an unstable state supported at the two locations. The unstable state is particularly noticeable when there is a radial gap 1006 between the insertion inlet of the radial bearing 1002 and the output shaft 1001 as shown in FIGS. 24 and 25.

The present disclosure provides a step motor with secured productivity, and an indicator instrument for a vehicle with secured productivity.

In one aspect of the present disclosure, a step motor that rotationally drives a rotating body includes:

an output gear having an output shaft that rotates around a rotation center line together with the rotating body, and a final gear extending radially outward from the output shaft;

a radial bearing having an inner circumference side that radially supports the output shaft, on one side of the final gear in an axial direction;

a reduction gear mechanism having a first reduction gear meshed with the final gear, and a second reduction gear meshed with the first reduction gear on the one side of the final gear in the axial direction; and a protrusion protruding from the radial bearing toward the other side in the axial direction, in a specific area extending from a longitudinal cross section of the output gear including the rotation center line to an opposite side away from the first reduction gear.

An indicator instrument for a vehicle according to the present disclosure includes the above-described step motor and a rotation indicator indicating a vehicle state value as a rotating body.

Accordingly, the first reduction gear meshes with the final gear of the output gear, and meshes with the second reduction gear on the side adjacent to the radial bearing, which is one side of the final gear in the axial direction. With such a meshing configuration, at the time of manufacture, the final gear of the output gear is to be meshed with the first reduction gear that has meshed with the second reduction gear in advance, while inserting the output shaft of the output gear into the radial bearing. At this time, the falling of the output gear can be suppressed even if the final gear is difficult to mesh with the first reduction gear.

This is because the output shaft is additionally supported on the opposite side opposite to the first reduction gear through the original rotation center line, while the support point of the final gear by the first reduction gear and the support point of the output shaft by the radial bearing are offset toward the first reduction gear from the rotation center line. The additional support point of the output shaft is defined by the protrusion protruding from the radial bearing toward the final gear, which is the other side in the axial direction, in the specific area spreading from the longitudinal cross section of the output shaft including the original rotation center line away from the first reduction gear.

Accordingly, since the output gear is in the stable support state, the falling of the output gear can be suppressed even if the final gear leans on the first reduction gear. Therefore, it becomes possible to secure productivity at the time of manufacture.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
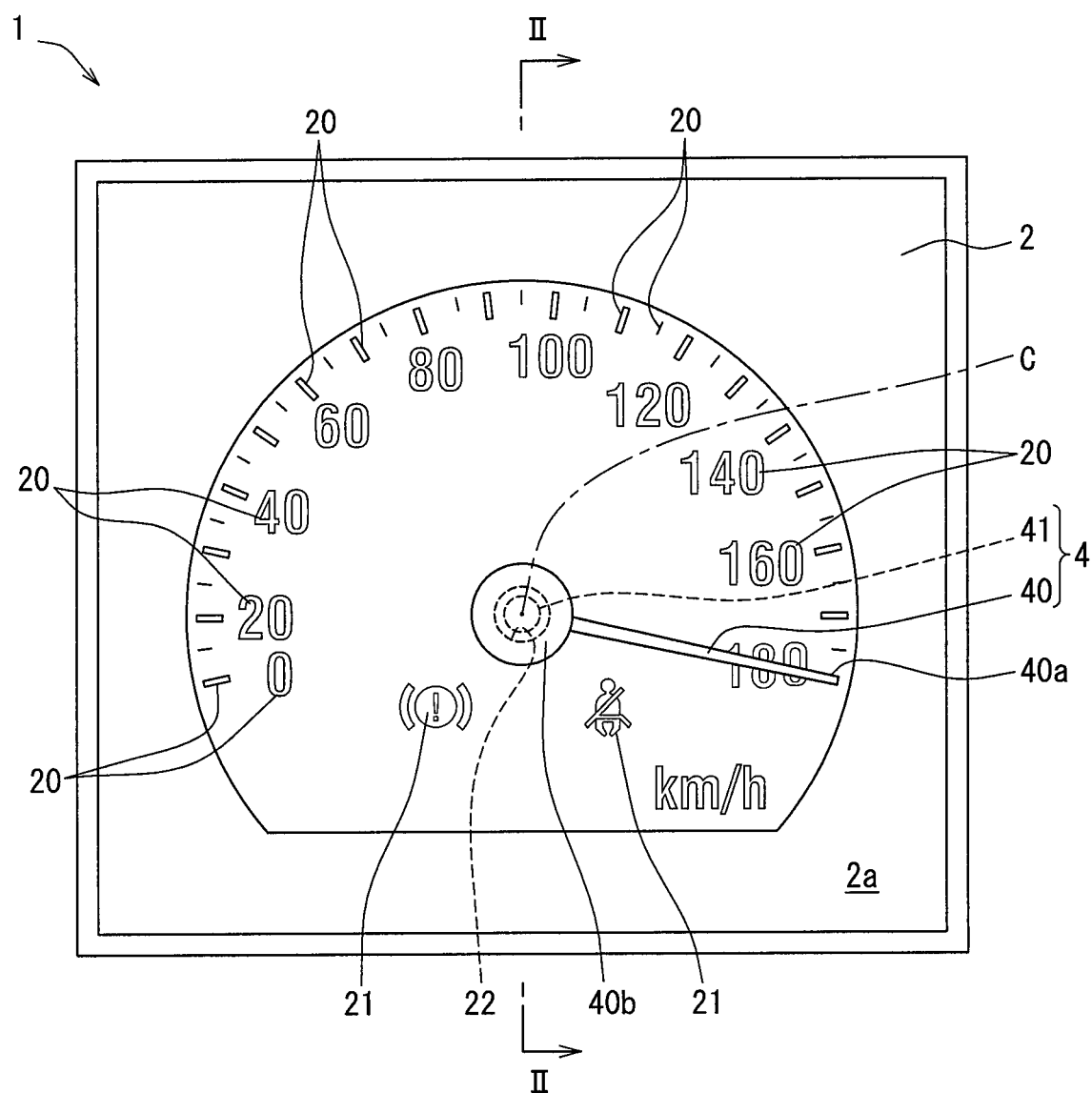
FIG. 1 is a front view illustrating an indicator instrument for a vehicle according to a first embodiment.
Figure 2:
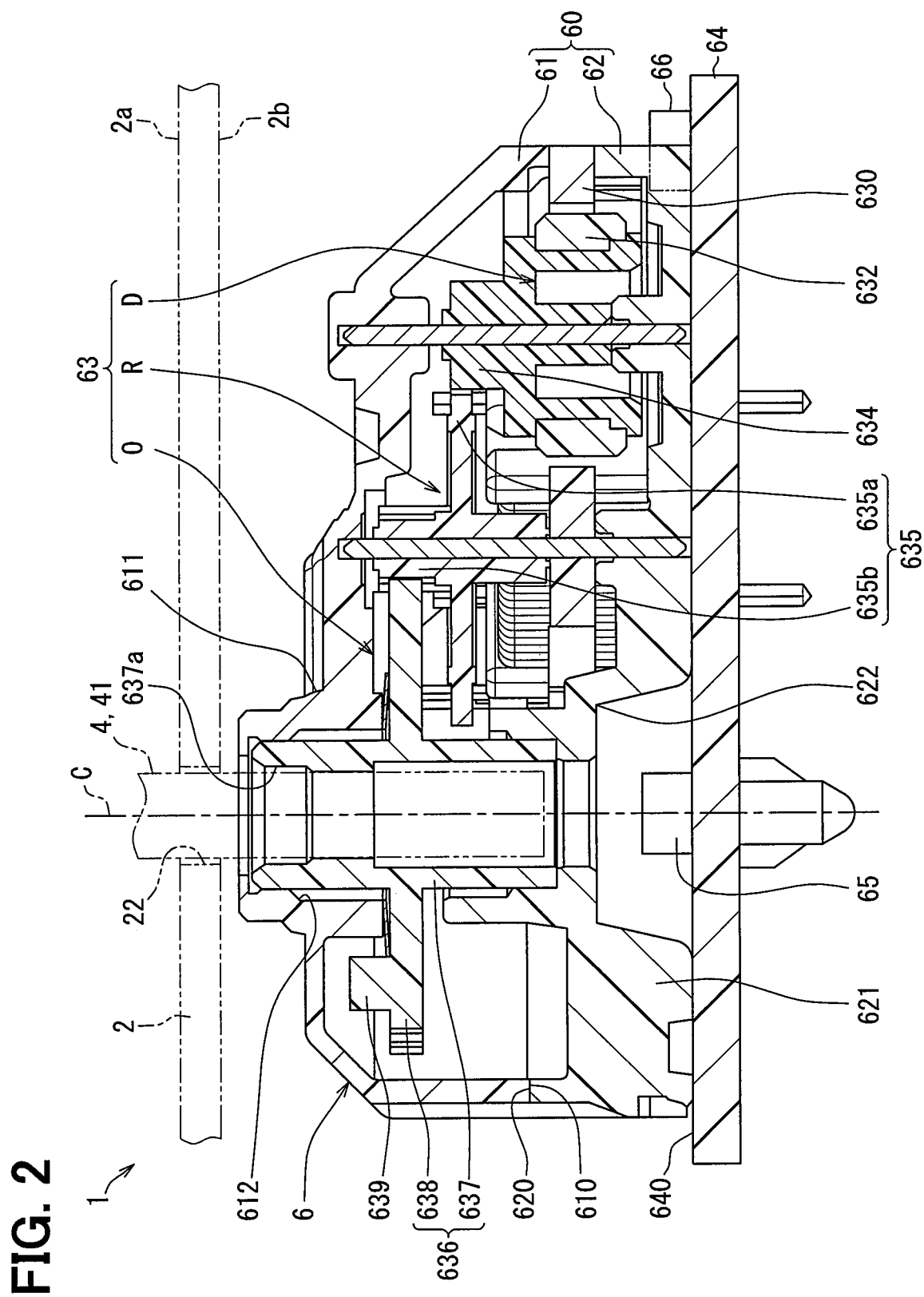
FIG. 2 is a cross-sectional view illustrating the indicator instrument including a step motor according to the first embodiment, taken along a line II-II of FIG. 1.

As shown in FIGS. 1 and 2, an indicator instrument 1 for a vehicle according to a first embodiment is installed on an instrument panel in the vehicle. The indicator instrument 1 for a vehicle includes a display member 2, a rotation indicator 4, and a step motor 6. In the following description, a "viewing side" means a side on which a display of the instrument 1 is visually recognized by an occupant on a driver's seat in the vehicle, and an "anti-viewing side" means a side opposite to the "viewing side".

The display member 2 is formed by laminating a light shielding printing layer on a light transmissive base material such as a polycarbonate resin or the like, and has a flat plate-like shape as a whole. A display surface 2a, which is one surface of the display member 2, is disposed on the viewing side. As shown in FIG. 1, in an open portion of the light shielding printing layer in the display member 2, numbers and scales arranged in a rotation direction of the rotation indicator 4 are formed as an index 20 in order to display a "vehicle state value". In this example, the "vehicle state value" in the present embodiment is a vehicle speed value as shown in FIG. 1, but may be a physical quantity such as an engine speed involved in the vehicle, for example. Further, a warning lamp 21 for issuing a warning is formed around a rotation shaft 41 of the rotation indicator 4 in an open portion of the light shielding printing layer in the display member 2.

The rotation indicator 4 as a "rotating body" is made of a light transmissive resin material such as an acrylic resin, and has an indicator body 40 and a rotation shaft 41. The indicator body 40 has an elongated needle shape as a whole, and is disposed on the viewing side of the display surface 2a of the display member 2. The indicator body 40 instructs the "vehicle state value" represented by the index 20 according to a rotational position by a point 40a. As shown in FIGS. 1 and 2, the rotation shaft 41 has a columnar shape extending from a base end 40b of the indicator body 40 to the anti-viewing side as a whole. The rotation shaft 41 is inserted into an indicator hole 22 that penetrates between two surfaces 2a and 2b in the display member 2. The rotation shaft 41 is connected to the step motor 6 on an anti-viewing side of the back surface 2b of the display member 2. As a result, the step motor 6 realizes the indication described above by the indicator body 40 by rotationally driving the rotation indicator 4 around the rotation center line C which is the axis line of the rotation shaft 41.

As shown in FIG. 2, the step motor 6 is disposed on the anti-viewing side of the back surface 2b of the display member 2. The step motor 6 includes a motor casing 60, a motor body 63, a motor board 64, and light sources 65 and 66.

Figure 3:
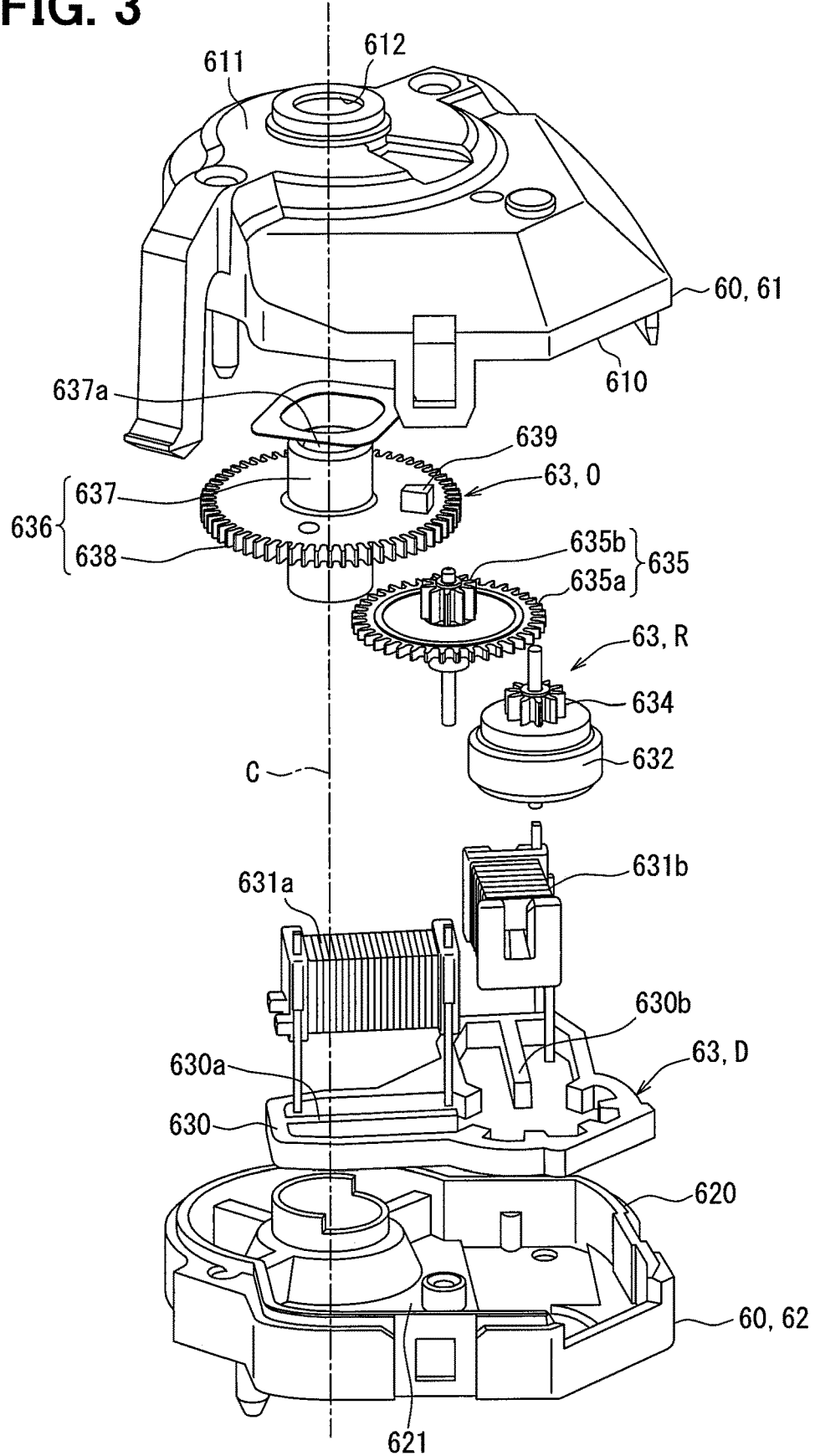
FIG. 3 is an exploded perspective view illustrating the step motor according to the first embodiment.
Figure 4:
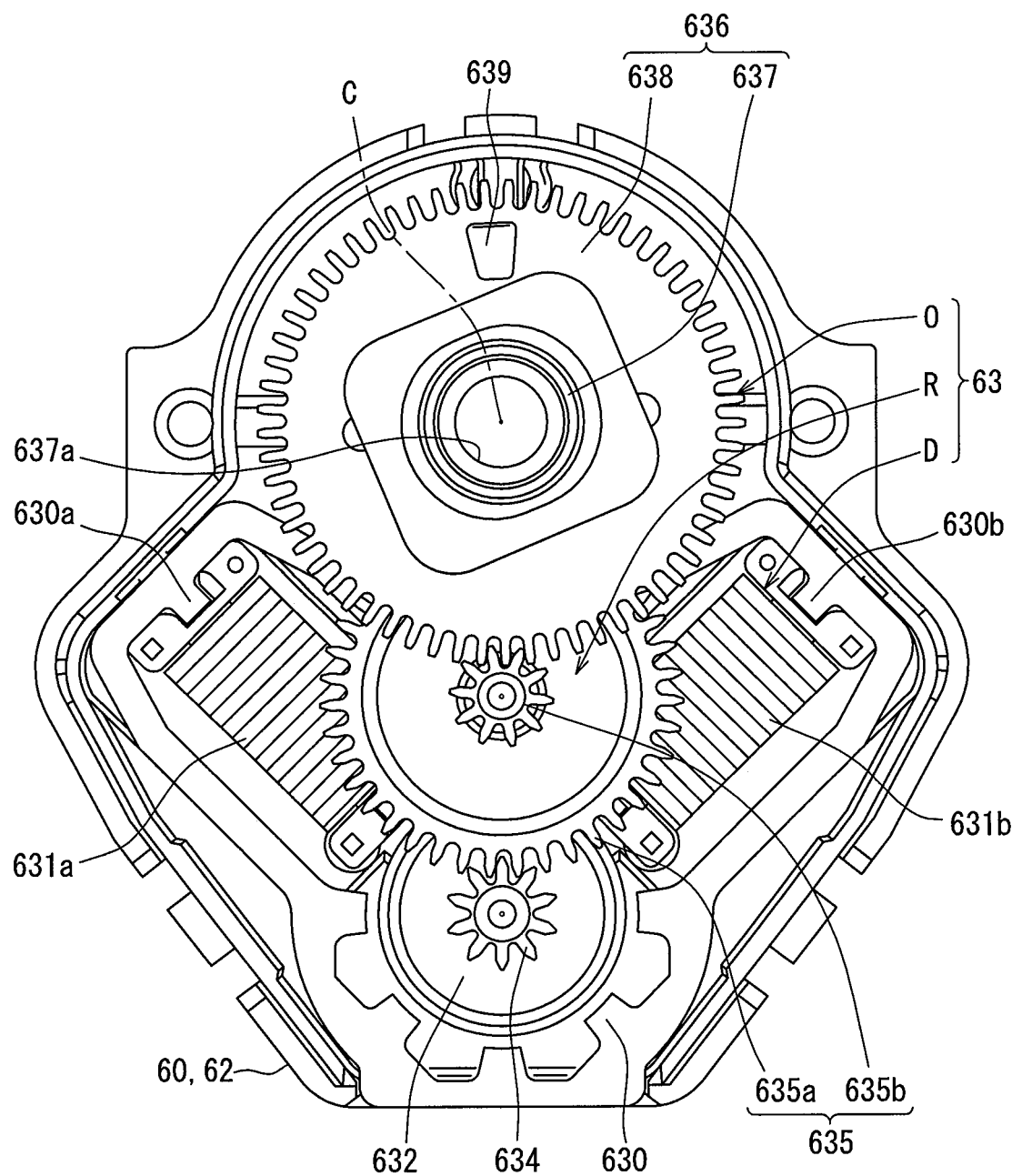
FIG. 4 is a plan view illustrating an inside of the step motor according to the first embodiment.
Figure 5:
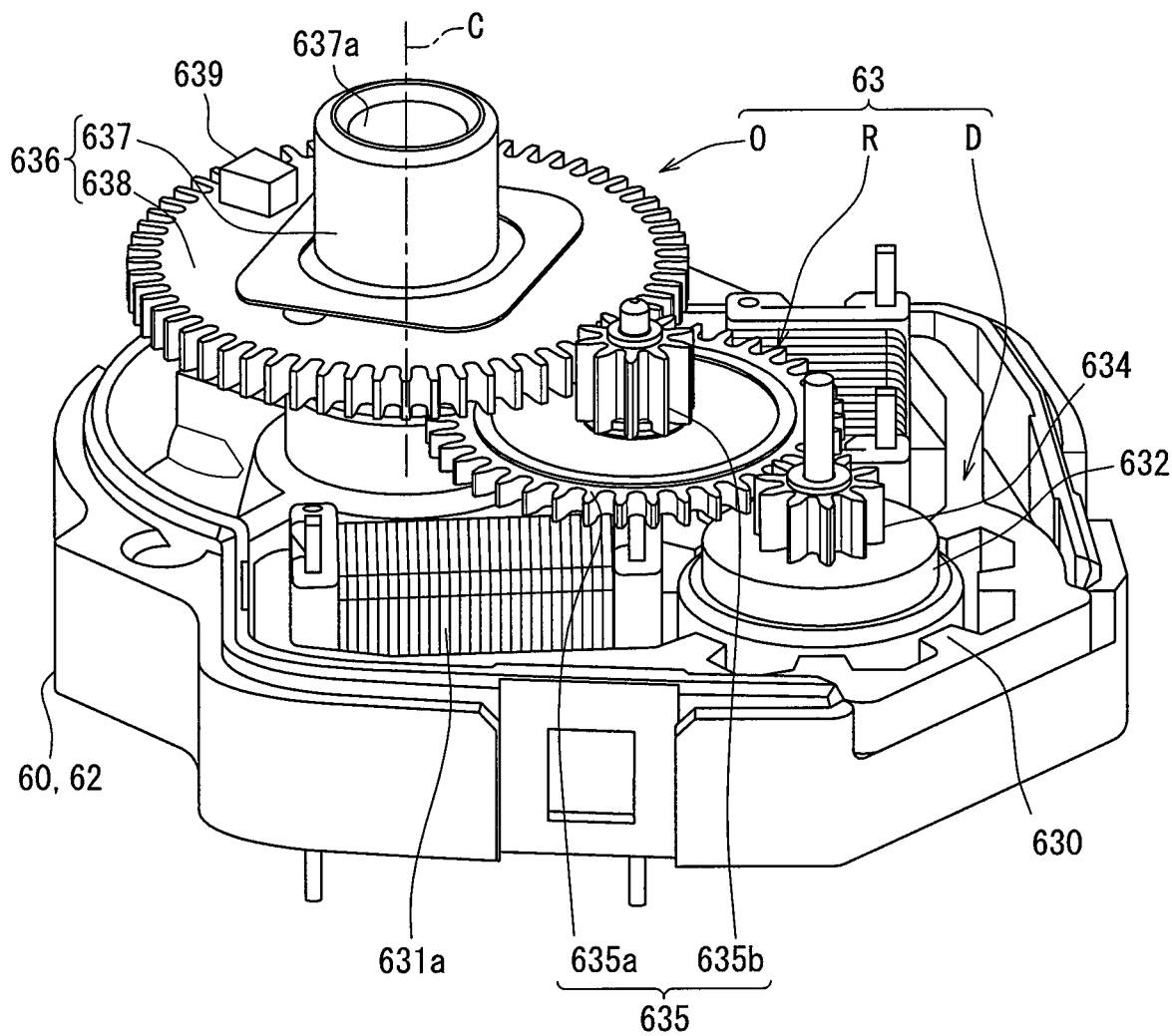
FIG. 5 is a perspective view illustrating the inside of the step motor according to the first embodiment.

As shown in FIGS. 2 and 3, the motor casing 60 is formed by combining a pair of case members 61 and 62, and has a hollow shape as a whole. The case members 61 and 62 are each made of a light shielding resin material such as modified polyphenylene ether resin (m-PPE), and are each formed in a cup-like shape. The case members 61 and 62 are coupled to each other by snap-fit fitting in a state in which respective opening edge portions 610 and 620 overlap with each other. Each of the case members 61 and 62 has through holes 612 and 622 that penetrate through bottom portions 611 and 621 on the rotation center line C of the indicator body 40, respectively. The first case member 61 is disposed to face the back surface 2b on the anti-viewing side of the display member 2. The second case member 62 is disposed on the anti-viewing side of the first case member 61.

As shown in FIG. 2, the motor board 64 is formed by laminating a metal wiring layer on a printed circuit board such as a glass epoxy substrate or the like, and has a flat plate-like shape as a whole. The motor board 64 is disposed on the anti-viewing side of the motor casing 60. A mounting surface 640, which is one surface of the motor board 64, has a planar shape. The motor casing 60 and the light sources 65 and 66 are held on the mounting surface 640.

As shown in FIGS. 2 to 5, the motor body 63 is housed in the motor casing 60. As a result, the motor body 63 is mounted on the mounting surface 640 of the motor board 64 through the motor casing 60. The motor body 63 includes a driving source D, a speed reduction mechanism R, and a rotation output mechanism 0.

The driving source D is formed by combining a yoke 630, two-phase coils 631a and 631b, and a magnet rotor 632 together, and is deviated from the rotation center line C of the indicator body 40 in a radial direction. The yoke 630 is formed in a frame shape and made of a magnetic metal material such as iron and is fixed to the motor casing 60. The yoke 630 has a pair of magnetic poles 630a and 630b protruding toward an inner peripheral side. The coil 631a of the A-phase is wound around one magnetic pole 630a, and the coil 631b of the B-phase is wound around the other magnetic pole 630b. The coils 631a and 631b of the A- and B-phases are electrically connected to a metal wiring layer of the motor board 64 through a through hole that penetrates through the second case member 62 of the motor casing 60.

The magnet rotor 632 is formed in a disc shape and made of a magnetic metal material such as ferrite and is spaced from each of the magnetic poles 630a and 630b and disposed on the inner peripheral side of the yoke 630. The magnet rotor 632 is radially supported and thrust-supported by the motor casing 60 so as to be rotatable about an axis line substantially parallel to the rotation center line C of the indicator body 40. N and S poles as magnetic poles are alternately magnetized in the rotation direction at an outer peripheral portion of the magnet rotor 632.

In the driving source D configured as described above, AC signals having phases shifted by 90 degrees from each other are applied to the coils 631a and 631b of the phases A and B from an external control circuit through a metal wiring layer of the motor board 64. As a result, the alternating magnetic flux generated in each of the coils 631a and 631b passes between the yoke 630 and the magnet rotor 632, thereby driving the rotor 632 to a predetermined rotational position.

The speed reduction mechanism R is formed by combining a magnet gear 634, and an intermediate gear 635 together, and is disposed radially away from the rotation center line C of the indicator body 40. The magnet gear 634 corresponding to a second reduction gear is made of a hard resin material such as polyacetal resin (POM), and has a spur gear shape. The magnet gear 634 is radially supported and thrust-supported by the motor casing 60 so as to be integrally rotatable with the magnet rotor 632.

The intermediate gear 635 as the "first reduction gear" is formed of a hard resin material such as polybutylene terephthalate resin (PBT), and integrally has a pair of gears 635a and 635b aligned in the axial direction. Each of the gears 635a, 635b has a spur gear shape. Each of the gears 635a, 635b is radially supported and thrust-supported by the motor casing 60 so as to be rotatable about an axis line substantially parallel to the rotation center line C of the indicator body 40. The idle gear 635a meshes with the magnet gear 634 on the anti-viewing side, which is "one side in the axial direction," of the pinion gear 635b and the final gear 638 meshing with each other to reduce the speed of rotation.

The rotation output mechanism O is formed by combining an output gear 636, and a rotation stopper 639, and is disposed on the rotation center line C of the indicator body 40. The output gear 636, and the rotation stopper 639 are integrally made of a hard resin material such as polyacetal resin (POM). The output gear 636, and the rotation stopper 639 are radially supported and thrust-supported by the motor casing 60 so as to be integrally rotatable about the rotation center line C of the indicator body 40.

The output gear 636 has an output shaft 637 and a final gear 638. The output shaft 637 has a cylindrical shape as a whole. The rotation shaft 41 of the rotation indicator 4 is coaxially press-fitted into a center hole 637a of the output shaft 637. As a result, the output shaft 637 rotates around the rotation center line C together with the rotation indicator 4, thereby outputting a rotational driving force to the rotation indicator 4. The final gear 638 has a spur gear shape spreading radially outward from the output shaft 637. The final gear 638 meshes with the pinion gear 635b of the intermediate gear 635 in the reduction gear mechanism R to decelerate the rotation of the intermediate gear 635. With the above configuration, the rotational driving force increased by a deceleration action of the speed reduction mechanism R from the driving source D is given from the rotation output mechanism O to the rotation indicator 4, in the motor body 63.

The rotation stopper 639 has a projecting piece shape which protrudes from the final gear 638 on the viewing side, which is "the other side in the axial direction". The rotation stopper 639 is provided so as to be engaged with a fix stopper of the motor casing 60 at limit positions on both sides of the rotation indicator 4 to determine a rotation range of the rotation indicator 4. As a result, even if the rotational driving force is applied from the rotation output mechanism O to the rotation indicator 4, the rotation of the rotation indicator 4 is limited within the rotation range.

As shown in FIG. 2, the light source 65 for illuminating the rotating body is disposed on the rotation center line C of the indicator body 40 in the through hole 622 of the second case member 62, and is mounted on the mounting surface 640 of the motor board 64. The light source 65 mainly includes LED (Light Emitting Diode) and is electrically connected to a metallic wiring layer of the motor board 64.

The light source 65 emits light by being energized by an external control circuit through the metal wiring layer. The light emitted from the light source 65 passes through the through hole 622 of the second case member 62 and the center hole 637a of the output shaft 637, and is incident on the rotation shaft 41 of the rotation indicator 4, thereby being guided to the indicator body 40 of the rotation indicator 4. As a result, the rotation indicator 4 is illuminated through the motor body 63, so that the indicator body 40 is visually recognized in a light emitting state.

The multiple light sources 66 for illuminating the display are disposed around the second case member 62 and mounted on the mounting surface 640 of the motor board 64. Each of the light sources 66 mainly includes LED, and is electrically connected to the metal wiring layer of the motor board 64. Each of the light sources 66 emits light by being energized by an external control circuit through the metal wiring layer at the time of necessary warning. The light emitted from the light source 66 passes around the motor casing 60 and is incident on the display member 2. As a result, the display member 2 is directly illuminated, so that the warning lamp 21 is visually recognized in a light emitting state at the time of necessary warning.

(Falling Suppression Structure)

Next, a falling suppression structure 8 and its related structure of the first embodiment shown in FIGS. 6 to 9 will be described in detail. In the following description, the axial direction along the rotation center line C shown in FIGS. 6 to 9 and the radial direction substantially perpendicular to the rotation center line C will be simply referred to as the axial direction and the radial direction, respectively.

Figure 6:
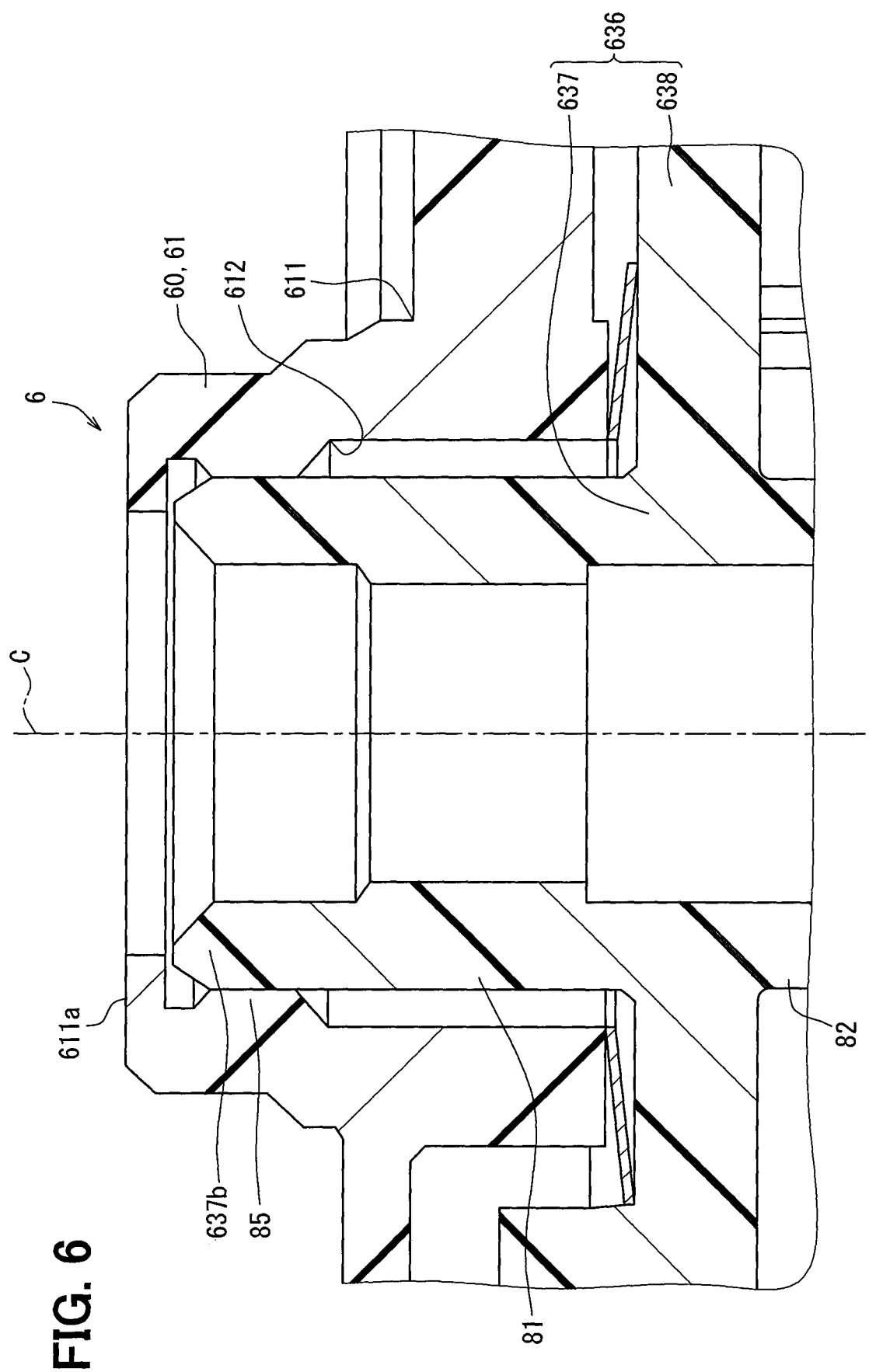
FIG. 6 is an enlarged cross-sectional view of FIG. 2.
Figure 7:
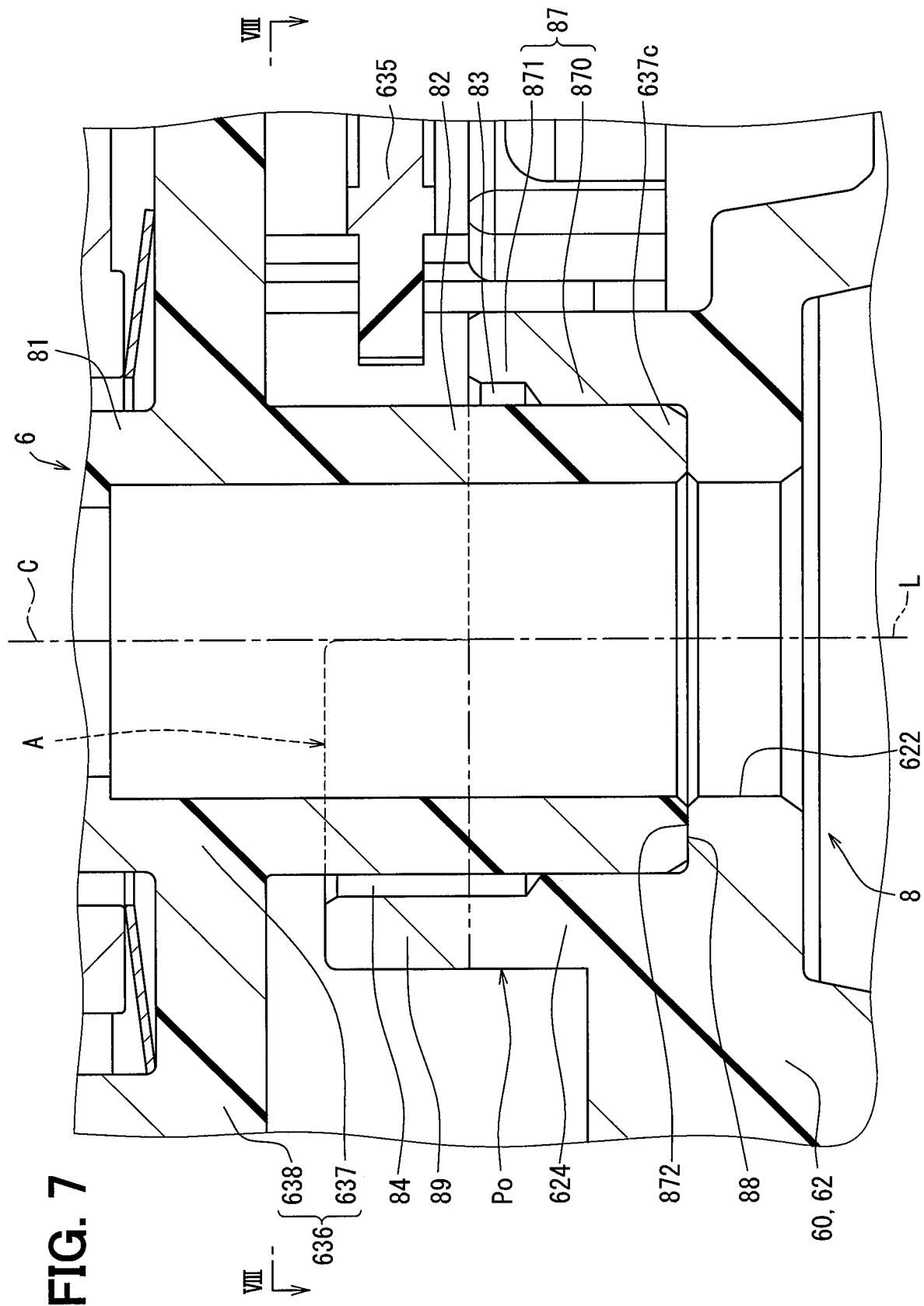
FIG. 7 is an enlarged cross-sectional view of FIG. 2.
Figure 8:
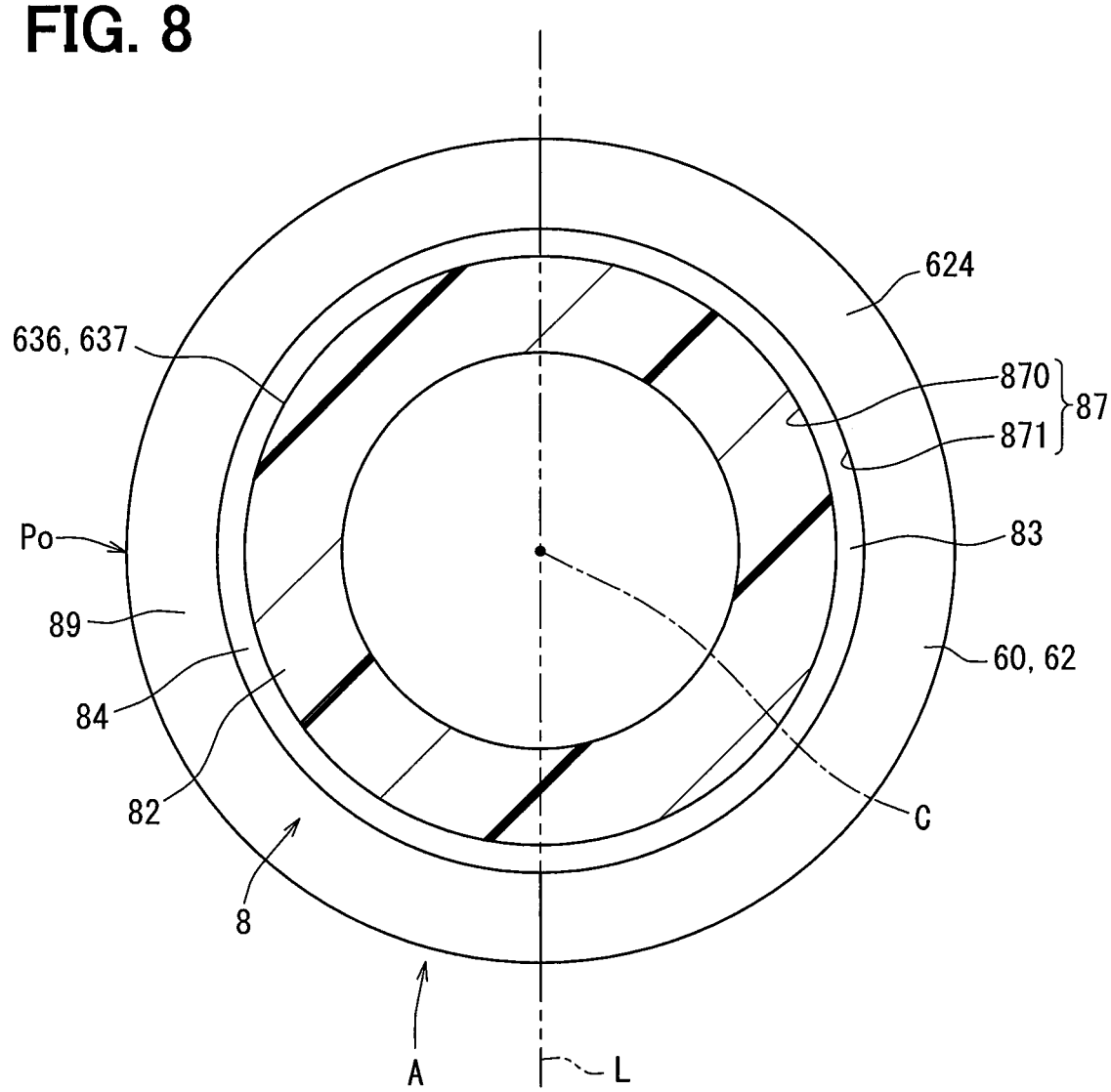
FIG. 8 is a cross-sectional view taken along a line VIII-VIII of FIG. 7.

As shown in FIGS. 6-8, the output shaft 637 of the output gear 636 has a first outer peripheral straight portion 81 on the viewing side of the final gear 638 in the axial direction and a second outer peripheral straight portion 82 on the anti-viewing side of the final gear 638 in the axial direction. In other words, the output shaft 637 has the second outer peripheral straight portion 82 and the first outer peripheral straight portion 81 respectively on the "one side in the axial direction" and the "the other side in the axial direction" of the final gear 638.

As shown in FIG. 6, the first outer peripheral straight portion 81 is provided in a predetermined range of the output shaft 637 in the axial direction, from the tip end 637b on the viewing side to the final gear 638 on the anti-viewing side. The outer peripheral surface of the first outer peripheral straight portion 81 has a cylindrical surface shape that extends straight along the axial direction. As shown in FIGS. 7 and 8, the second outer peripheral straight portion 82 is provided in a predetermined range of the output shaft 637 in the axial direction, from the base end 637c on the anti-viewing side to the final gear 638 on the viewing side. The outer peripheral surface of the second outer peripheral straight portion 82 has a cylindrical surface shape extending straight in the axial direction.

As shown in FIG. 6, the first case member 61 of the motor casing 60 has the first radial bearing 85 formed by a part of the through holes 612 in the axial direction coaxially surrounding the output shaft 637. The first radial bearing 85 is provided in a predetermined range of the first case member 61 in the axial direction, from the outer surface 611a of the bottom portion 611 to the anti-viewing side. The inner circumferential surface of the first radial bearing 85 has a cylindrical hole shape extending straight in the axial direction. The inner diameter of the first radial bearing 85 is set smaller than the inner diameter of a portion of the through hole 612 located on both sides of the bearing 85 in the axial direction.

A part of the first outer peripheral straight portion 81 in the axial direction is coaxially inserted entirely in the first radial bearing 85 in the axial direction. In the present embodiment, the first outer peripheral straight portion 81, which is slightly smaller in diameter than the bearing 85 before insertion, is fitted on the inner peripheral side of the first radial bearing 85 so as to be relatively slidable. Thus, the first radial bearing 85 radially supports, from the outer peripheral side, the output shaft 637 inserted on the inner peripheral side, on the anti-viewing side, which is "one side in the axial direction" of the final gear 638.

Figure 9:
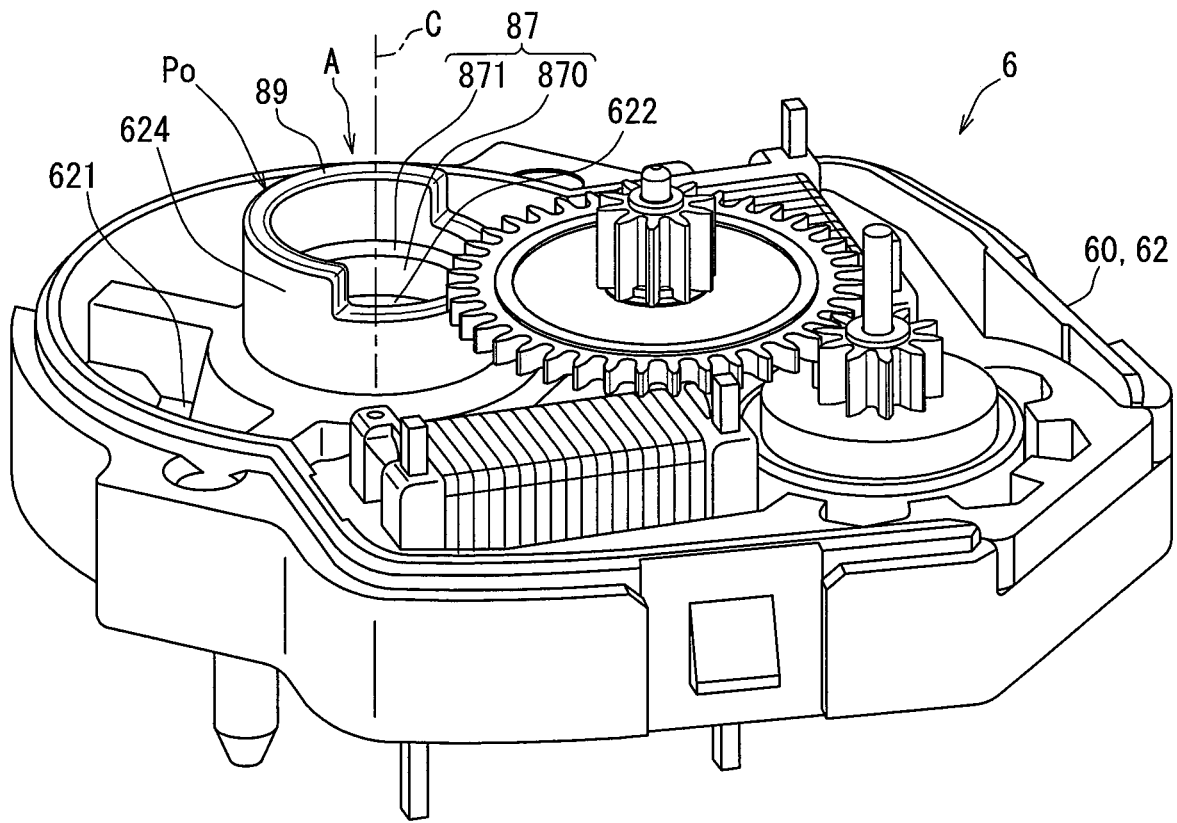
FIG. 9 is a perspective view illustrating a falling suppression structure according to the first embodiment.

As shown in FIGS. 7 to 9, the second case member 62 of the motor casing 60 has a cylindrical portion 624 projecting from the bottom portion 621 to the viewing side which is "the other side in the axial direction," and a second radial bearing 87 is formed by a part of the cylindrical portion 624 in the axial direction. The second radial bearing 87 is provided in a predetermined range of the second case member 62 in the axial direction from the bottom portion 621. The second radial bearing 87 has a sliding support portion 870 and a loosely insertion portion 871.

The inner surface of the sliding support portion 870 defines a bottomed cylindrical surface that extends straight along the axial direction and is coaxially continuous to the through hole 622 of the second case member 62. The inner diameter of the sliding support portion 870 is set larger than the inner diameter of the through hole 622. Thus, the bottom surface 872 of the sliding support portion 870 has an annular planar shape. The loosely insertion portion 871 forms an open end of the second radial bearing 87 on the viewing side. The inner surface of the loosely insertion portion 871 defines a cylindrical surface shape coaxially continuous to the sliding support portion 870 and extending straight in the axial direction. The loosely insertion portion 871 is set to have a diameter larger than the inner diameter of the sliding support portion 870. As shown in FIGS. 7 and 8, a part of the second outer peripheral straight portion 82 in the axial direction is coaxially inserted in the entire sliding support portion 870 in the axial direction of the second radial bearing 87, and a part of the second outer peripheral straight portion 82 in the axial direction is coaxially inserted in the entire loosely insertion portion 871 of the second radial bearing 87 in the axial direction. In the present embodiment, the second outer peripheral straight portion 82, which is slightly smaller in diameter than the sliding support portion 870, is fitted on the inner peripheral side of the sliding support portion 870 so as to be relatively slidable. Further, in the present embodiment, the end surface 88 of the base end 637c of the output shaft 637 shaped in an annular planar shape is in surface contact with the bottom surface 872 of the sliding support portion 870 so as to be relatively slidable. Furthermore, in the present embodiment, the second outer peripheral straight portion 82 is loosely inserted into the inner peripheral side of the loosely insertion portion 871, which forms the insertion inlet (that is, the open end on the viewing side) of the second radial bearing 87, and a radial gap 83 is defined between the second outer peripheral straight portion 82 and the loosely insertion portion 871. As described above, the second radial bearing 87 radially supports the output shaft 637 from the outer peripheral side while thrust-supporting the output shaft 637 inserted on the inner peripheral side at the anti-viewing side with respect to the final gear 638.

As shown in FIGS. 7-9, the second case member 62 has a protrusion 89 that protrudes further toward the viewing side from the second radial bearing 87 formed by the cylindrical portion 624.

The protrusion 89 is provided in a predetermined range in the axial direction from the second radial bearing 87 of the second case member 62. The inner peripheral surface of the protrusion 89 has a circular arc surface shape coaxially continuous to the loosely insertion portion 871 of the second radial bearing 87 and straightly extended in the axial direction. The protrusion 89 is set to have an inner diameter larger than the inner diameter of the sliding support portion 870 of the second radial bearing 87 and substantially the same diameter as the loosely insertion portion 871 of the radial bearing 87. Thus, as shown in FIGS. 7 and 8, a radial gap 84 is defined between the protrusion 89 and the second outer peripheral straight portion 82 of the output shaft 637 inserted in the second radial bearing 87. The radial gap 84 between the protrusion 89 and the second outer peripheral straight portion 82 is in axial communication with the radial gap 83 between the loosely insertion portion 871 and the straight portion 82 of the second radial bearing 87, with substantially the same width in the radial direction. In FIG. 7, the boundary between the protrusion 89 and the second radial bearing 87 is schematically shown by a two-dot chain line.

As shown in FIGS. 7 to 9, the protrusion 89 of the present embodiment protrudes from the second radial bearing 87 within a specific area A as a space extending from the longitudinal cross section L of the output gear 636 including the rotation center line C away from the intermediate gear 635. Thus, in the specific area A from the longitudinal cross section L away from the intermediate gear 635, the height of the cylindrical portion 624 forming the second radial bearing 87 is higher by the height of the protrusion 89 than that in an area between the longitudinal cross section L and the intermediate gear 635. Moreover, the protrusion 89 of this embodiment is continuously extended over the entire specific area A with the range of 180 degrees around the rotation center line C. Thus, the protrusion 89 has a structure provided at least at an opposite position Po, in the specific area A, opposite to the intermediate gear 635 with respect to the rotation center line C in the radial direction.

Figure 10:
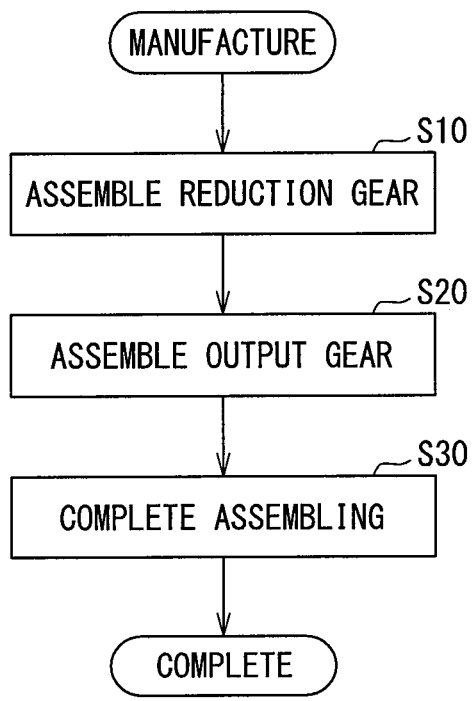
FIG. 10 is a flowchart illustrating a manufacturing flow of the step motor according to the first embodiment.

The step motor 6 provided with the falling suppression structure 8 is manufactured according to the flow shown in FIG. 10. First, in step S10, the speed reduction mechanism is assembled. Specifically, after the drive source D and the magnet gear 634 are inserted in the second case member 62 which is open at the upper side, the intermediate gear 635 is meshed with the magnet gear 634 to complete assembling the speed reduction mechanism R.

In step S20, the output gear is assembled. Specifically, the second outer peripheral straight portion 82 of the output shaft 637 of the output gear 636 is inserted into the second radial bearing 87 in the second case member 62 which is open at the upper side. At this time, the final gear 638 of the output gear 636 properly meshes with the intermediate gear 635 (see the state of FIG. 7) or does not mesh with the intermediate gear 635 (see the state of FIG. 11).

In step S30, the assembling is completed. Specifically, the output gear 636 is pressed onto the second radial bearing 87 while vibrating the output gear 636 in the second case member 62 which is open at the upper side. The meshing between the final gear 638 and the intermediate gear 635 is confirmed to complete the rotation output mechanism 0. Then, the first case member 61 is assembled to the second case member 62, and the case members 61 and 62 are held by the motor board 64. The step motor 6 whose manufacture is completed in this way is mounted on the vehicle after being incorporated into the indicator instrument 1 for a vehicle.

The effects of the first embodiment described above will be explained below.

According to the first embodiment, the intermediate gear 635 to be engaged with the final gear 638 is engaged with the magnet gear 634 on the side adjacent to the second radial bearing 87 that is "one side in the axial direction" of the final gear 638 of the output gear 636. The meshing arrangement according to the first embodiment is suitable for downsizing the output gear 636 having the rotation stopper 639 protruding from the final gear 638 to "the other side in the axial direction" opposite to the second radial bearing 87. Therefore, at the time of manufacture, while the output shaft 637 of the output gear 636 is inserted into the second radial bearing 87, the final gear 638 of the output gear 636 is to be engaged with the intermediate gear 635 meshed in advance with the magnet gear 634. At this time, in the first embodiment, as shown in FIG. 11, even if the final gear 638 is difficult to mesh with the intermediate gear 635, the falling of the output gear 636 can be suppressed.

Figure 11:
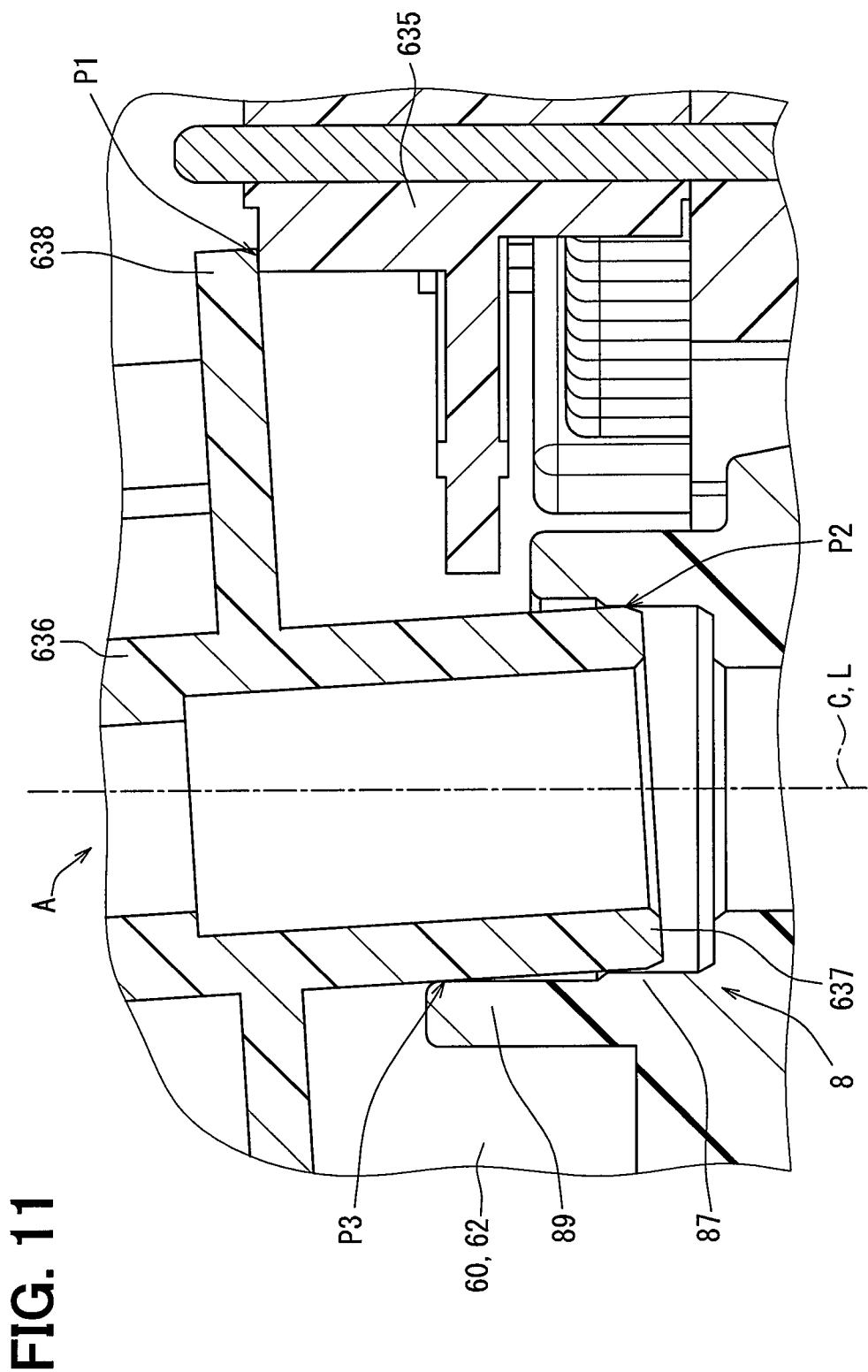
FIG. 11 is a cross-sectional view for explaining a method of manufacturing the step motor according to the first embodiment.

As shown in FIG. 11, while the support point P1 of the final gear 638 by the intermediate gear 635 and the support point P2 of the output shaft 637 by the second radial bearing 87 are offset from the original rotation center line C toward the intermediate gear 635, the support point P3 of the output shaft 637 is added to the side opposite to the intermediate gear 635 with respect to the rotation center line C. The support point P3 of the output shaft 637 is defined by the protrusion 89 protruding from the second radial bearing 87 toward the final gear 638, which is "the other side in the axial direction" in the specific area A extending from the longitudinal cross section L including the original rotation center line C to the opposite side away from the intermediate gear 635.

Accordingly, since the output gear 636 is in a stable support state, even if the final gear 638 leans on the intermediate gear 635, the output gear 636 can be restrained from falling down. In the first embodiment, although there is the radial gap 83 between the insertion inlet of the second radial bearing 87 and the second outer peripheral straight portion 82 of the output shaft 637, since the output gear 636 is in stable support state, the effect of suppressing the falling of the output gear 636 can be exhibited remarkably. Further, such a falling suppression of the output gear 636 is particularly effective, for example, when moving the second case member 62 between steps S20 and S30 in the manufacturing flow of FIG. 10. Therefore, it becomes possible to secure productivity at the time of manufacture.

According to the first embodiment, when the output gear 636 rides on the intermediate gear 635, the output gear 363 is easily inclined to the opposite side away from the intermediate gear 635 across the rotation center line C in the radial direction in the specific area A. Therefore, in the specific area A, since the protrusion 89 is provided at least at the opposite side Po to the intermediate gear 635 through the rotation center line C in the radial direction, the opposite side Po is easy to become the support point P3 of the output shaft 637 by the protrusion 89. Therefore, even if the output gear 636 rides on the intermediate gear 635 and leans at the time of manufacture, it is possible to secure productivity by enhancing the certainty of the effect of suppressing the falling of the output gear 636.

Furthermore, according to the first embodiment, the protrusion 89 entirely covers the specific area A around the rotation center line C at the inclination side of the output gear 636 that rides on the intermediate gear 635. Therefore, the protrusion 89 which spreads over the entire specific area A around the rotation center line C can reliably provide the support point P3 of the output shaft 637. Even if the output gear 636 rides on the intermediate gear 635 and leans at the time of manufacture, the effect of suppressing the falling of the output gear 636 is guaranteed, and productivity can be ensured.

Furthermore, according to the first embodiment, since the radial gap 84 is defined between the protrusion 89 and the output shaft 637 inserted into the second radial bearing 87 during manufacture, the protrusion 89 becomes difficult to interfere with the output shaft 637. Therefore, according to the protrusion 89, not only the falling of the output gear 636 but also the insertion interference of the output shaft 637 can be suppressed, and the productivity can be improved.

Second Embodiment

Figure 12:
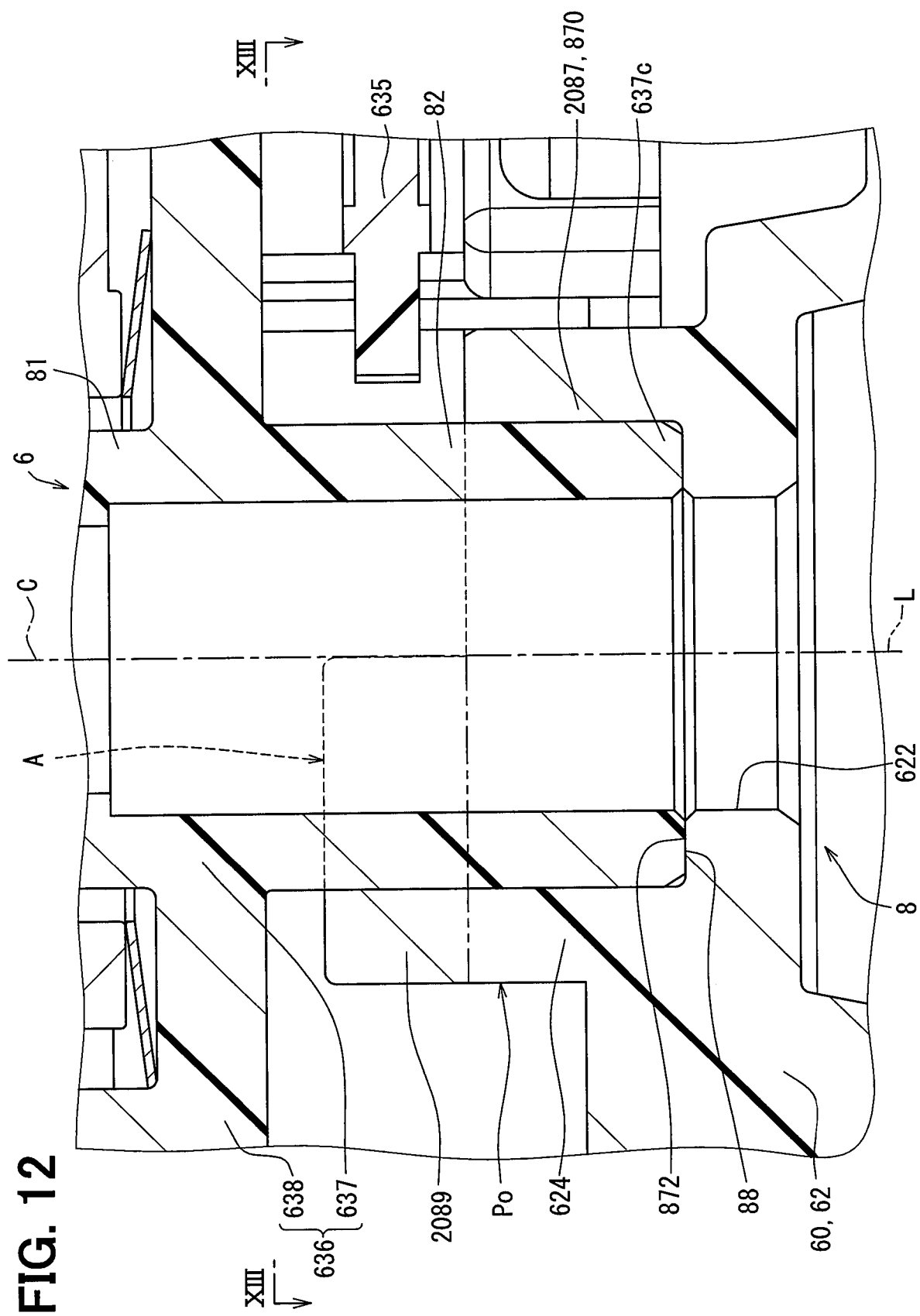
FIG. 12 is an enlarged cross-sectional view illustrating a step motor according to a second embodiment, corresponding to FIG. 7.
Figure 13:
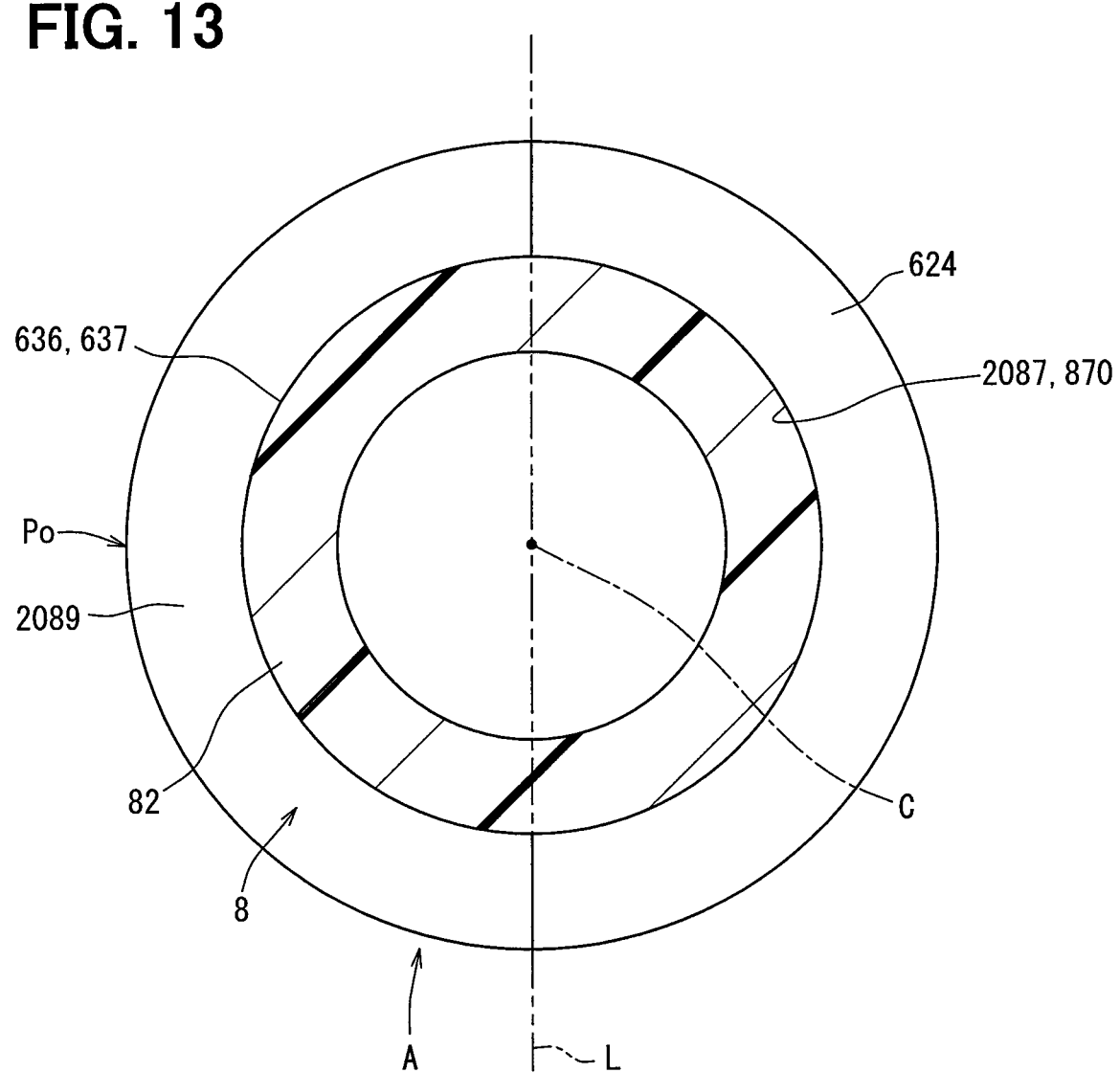
FIG. 13 is a cross-sectional view taken along a line XIII-XIII in FIG. 11.

A second embodiment shown in FIGS. 12 and 13 is a modification of the first embodiment.

The inner diameter of the protrusion 2089 according to the second embodiment is set to substantially the same as the inner diameter of the sliding support portion 870 in the second radial bearing 2087 without the loosely insertion portion 871. Thus, the protrusion 2089 radially supports the second outer peripheral straight portion 82 of the output shaft 637 inserted into the second radial bearing 87 from the outer peripheral side. The configuration other than that described above for the protrusion 2089 and the second radial bearing 2087 is the same as the configuration of the protrusion 89 and the second radial bearing 2087 according to the first embodiment.

According to the second embodiment, the protrusion 2089 radially supports the output shaft 637 inserted into the second radial bearing 2087 from the outer peripheral side, so the inclination of the output gear 636 can be restricted while the final gear 638 receives the reaction force from the intermediate gear 635. Accordingly, it is possible to secure not only the productivity at the time of manufacture but also the operation stability after the manufacture.

Third Embodiment

Figure 14:
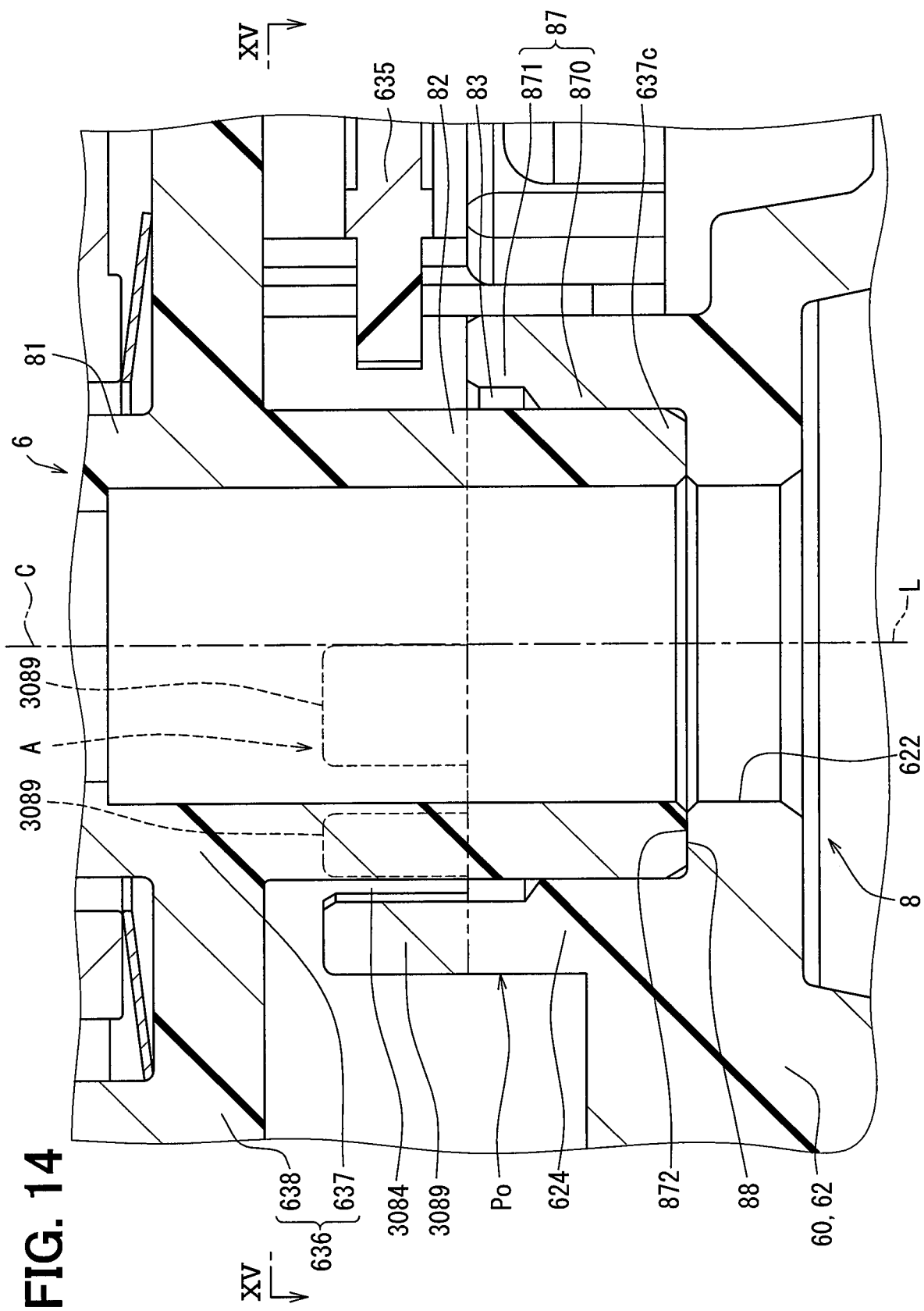
FIG. 14 is an enlarged cross-sectional view illustrating a step motor according to a third embodiment, corresponding to FIG. 7.
Figure 15:
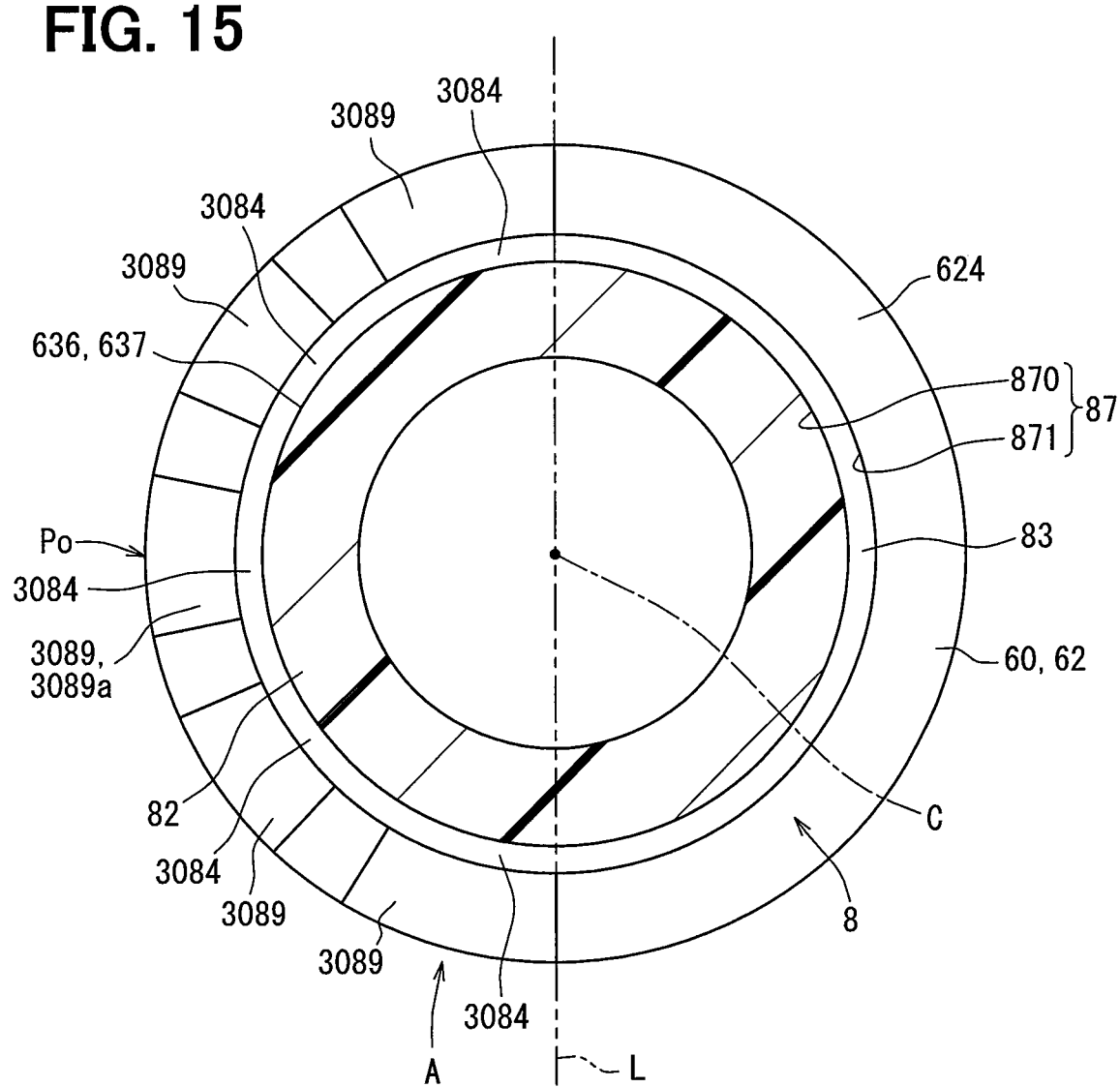
FIG. 15 is a cross-sectional view taken along a line XV-XV in FIG. 14.

A third embodiment shown in FIGS. 14 and 15 is a modification of the first embodiment, in which plural protrusions 3089 are disposed at substantially equal intervals around the rotation center line C in the specific area A. Each of the protrusions 3089 has a circular arc shape, and has an inner circumferential portion along an imaginary circle having substantially the same diameter as the inner diameter of the loosely insertion portion 871 of the second radial bearing 87. As a result, a radial gap 3084 is defined between each protrusion 3089 and the second outer peripheral straight portion 82 inserted in the second radial bearing 87 in the output shaft 637, and in axial communication with the radial gap 83. Among the plural protrusions 3089 in the specific area A, at least one specific protrusion 3089a is provided at an opposite position Po opposite to the intermediate gear 635 with respect to the rotation center line C in the radial direction. The configuration of each protrusion 3089 other than those described above is the same as that of the protrusion 89 according to the first embodiment.

According to the third embodiment, the plural protrusions 3089 dispersed around the rotation center line C in the specific area A cover the inclined side of the output gear 636 that rides on the intermediate gear 635, to easily define the support point P3 of the output shaft 637. Therefore, even if the output gear 636 rides on the intermediate gear 635 and leans at the time of manufacture, it is possible to secure productivity by enhancing the certainty of the effect of suppressing the falling of the output gear 636.

Other Embodiments

Figure 16:
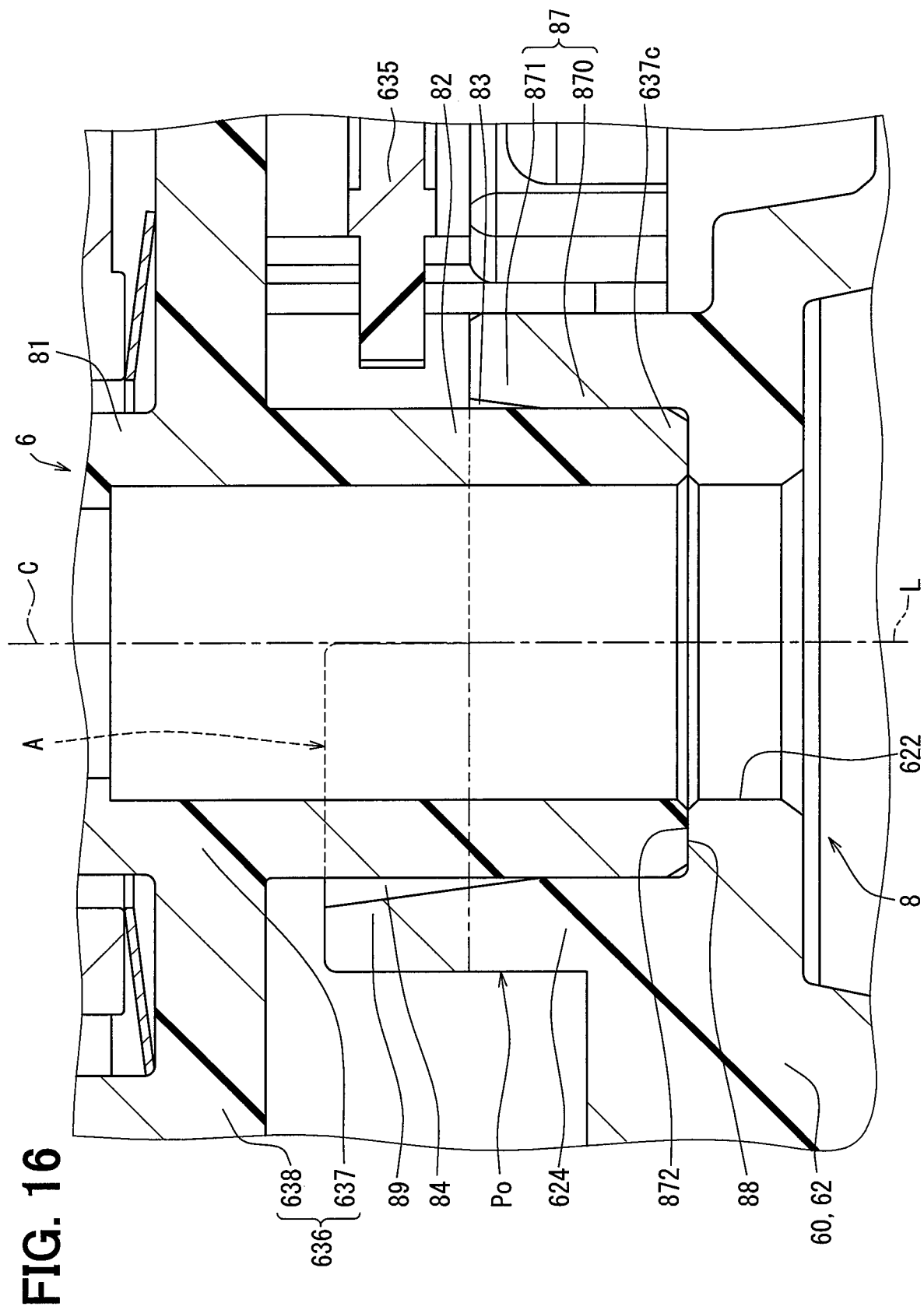
FIG. 16 is a cross-sectional view illustrating a modification of FIG. 7.
Figure 17:
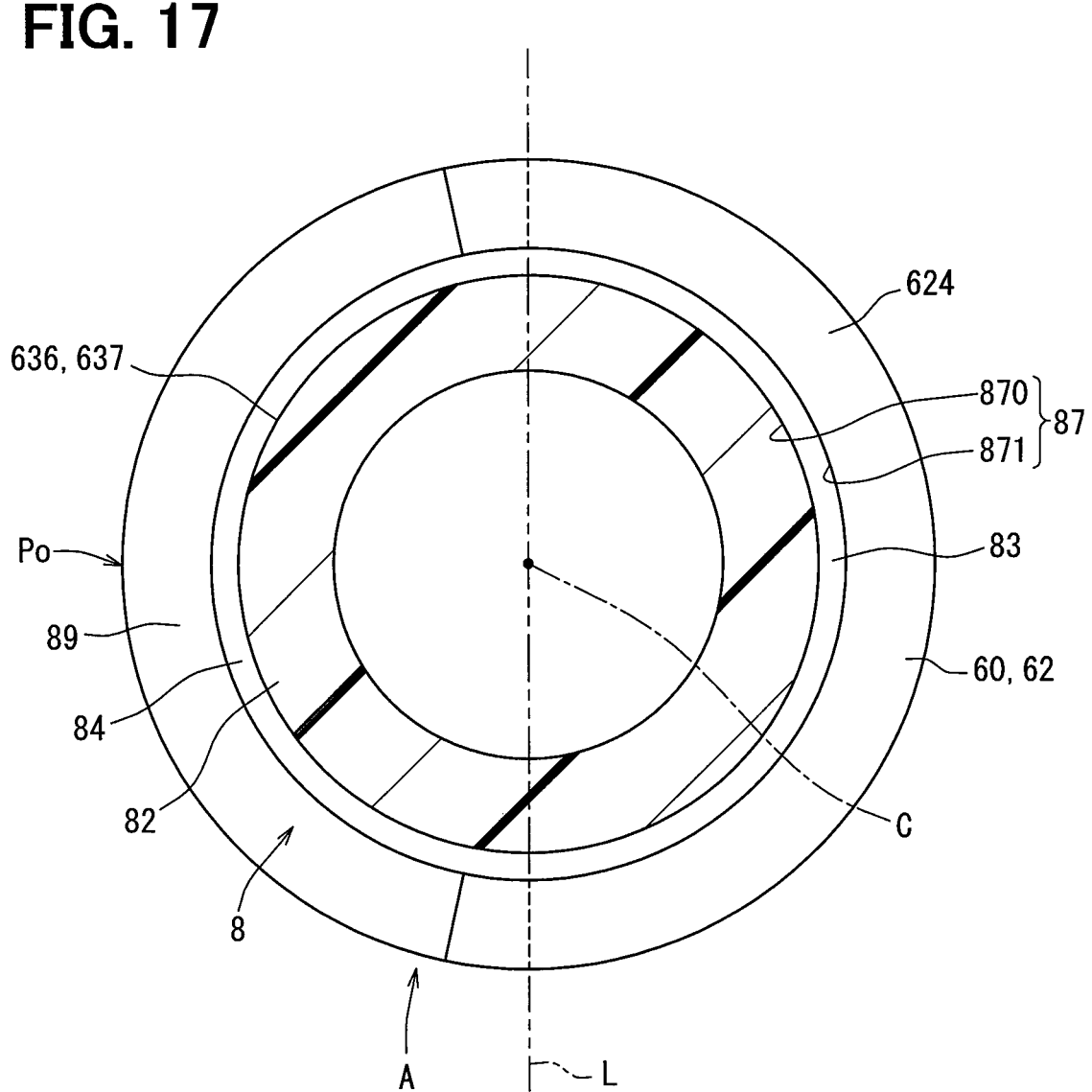
FIG. 17 is a cross-sectional view illustrating a modification of FIG. 8.
Figure 18:
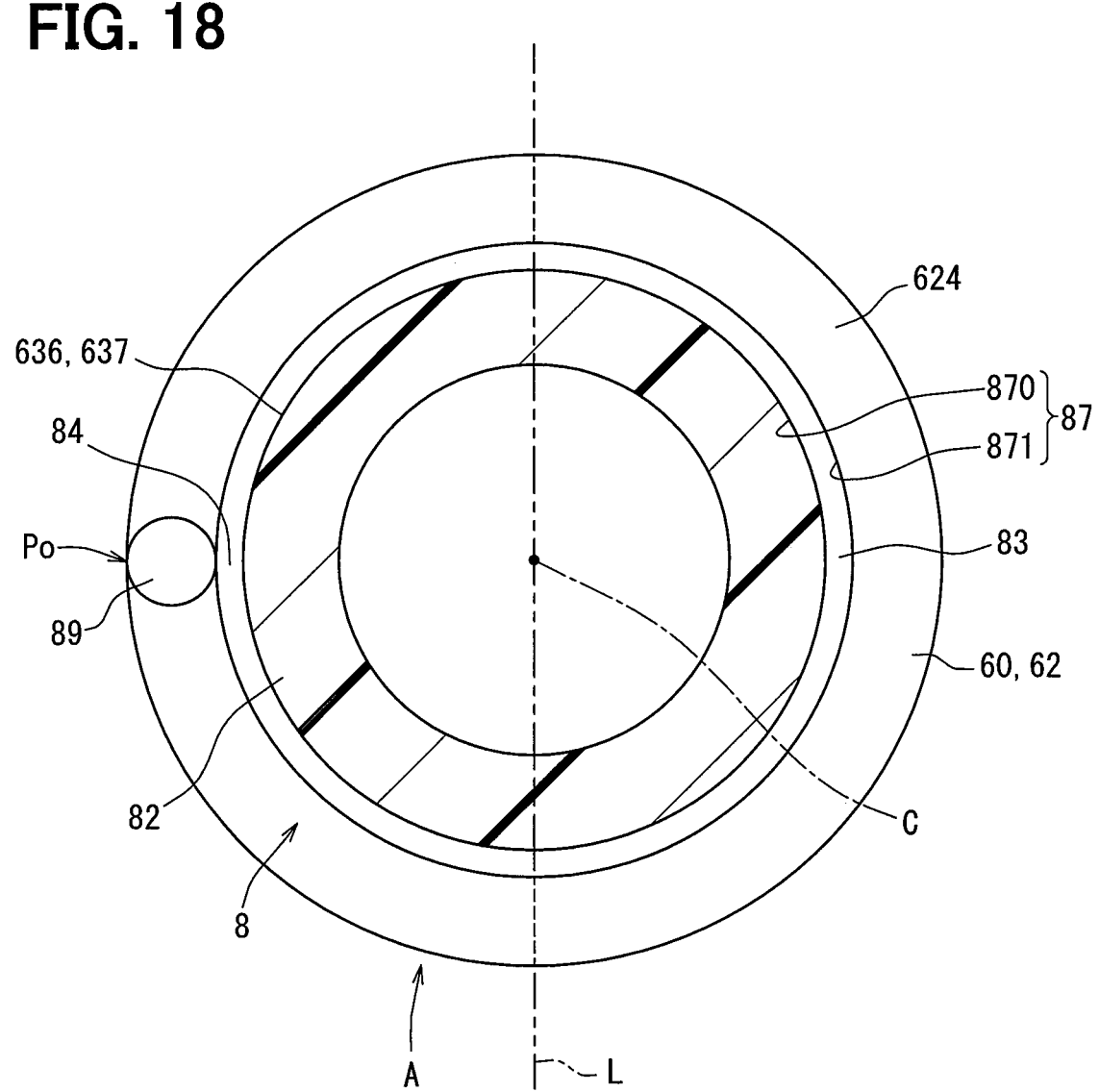
FIG. 18 is a cross-sectional view illustrating a modification of FIG. 8.
Figure 19:
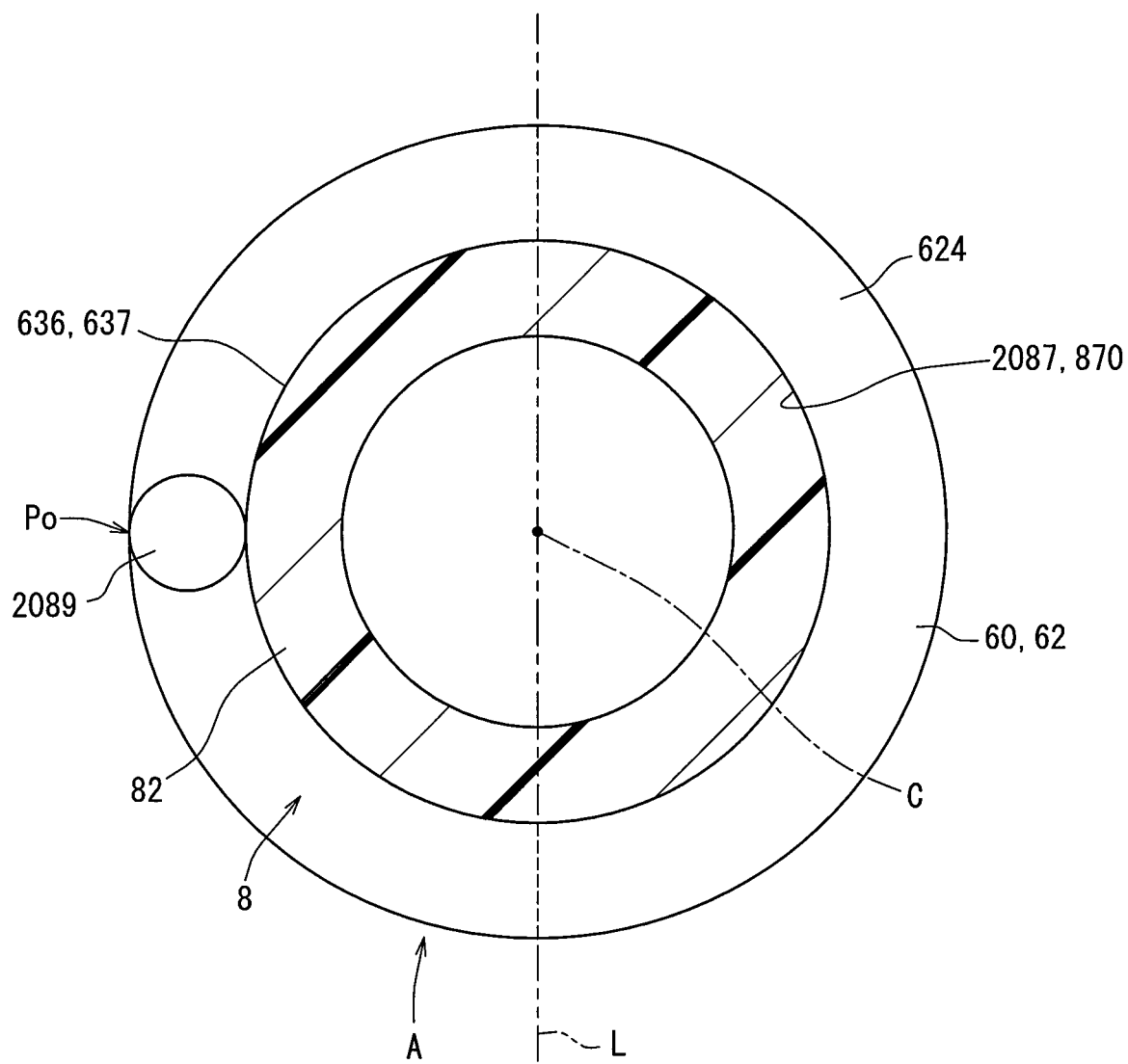
FIG. 19 is a cross-sectional view illustrating a modification of FIG. 13.

Although multiple embodiments have been described above, the present disclosure is not construed as being limited to these embodiments, and can be applied to various embodiments and combinations within a scope that does not depart from the gist of the present disclosure. FIGS. 16 to 18 representatively show modifications of the first embodiment. FIG. 19 representatively shows modifications on the second embodiment. FIGS. 20 to 23 representatively illustrate modifications of the third embodiment.

Specifically, in the first modification of the first embodiment, as shown in FIG. 16, the inner peripheral surface of the protrusion 89 and the inner peripheral surface of the loosely insertion portion 871 of the second radial bearing 87 may be formed in a tapered surface shape in which the diameter is gradually reduced toward the sliding support portion 870.

In the second modification of the first and second embodiments, as shown in FIGS. 17 to 19, the protrusion 89, 2089 is provided in an area less than 180 degrees around the rotation center line C in the specific area A. In the second modification related to the first embodiment, as shown in FIG. 18, the protrusion 89 is formed in a pin shape such as a cylindrical shape in contact with a virtual circle having substantially the same diameter as the inner diameter of the loosely insertion portion 871. The radial gap 84 may be formed between the second outer peripheral straight portion 82 and the protrusion 89. Similarly, in the second modification of the second embodiment, as shown in FIG. 19, the protrusion 2089 is formed in a cylindrical pin shape or the like in contact with a virtual circle having substantially the same diameter as the inner diameter of the sliding support portion 870 to support the second outer peripheral straight portion 82 from the outer peripheral side.

Figure 20:
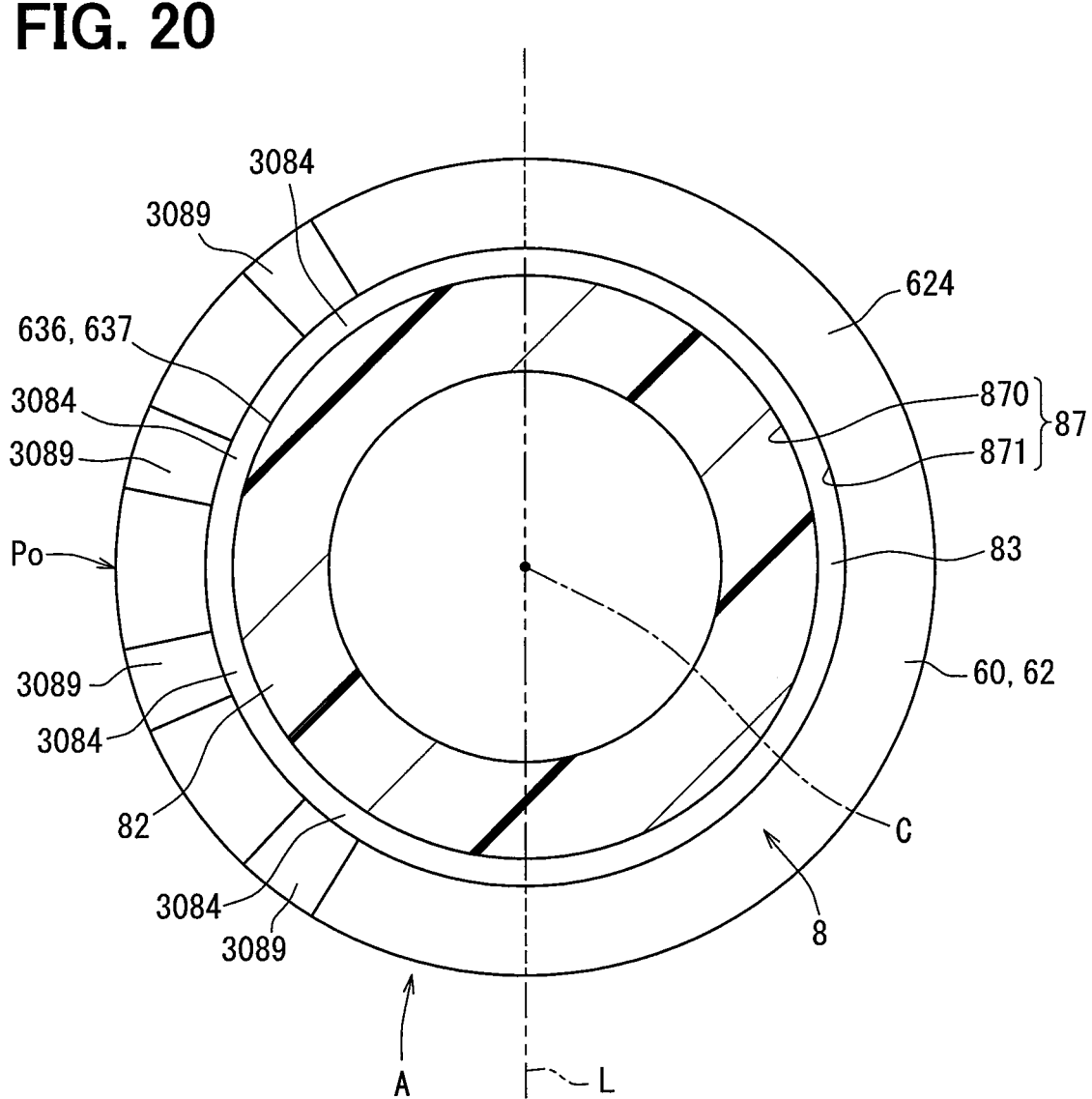
FIG. 20 is a cross-sectional view illustrating a modification of FIG. 15.
Figure 21:
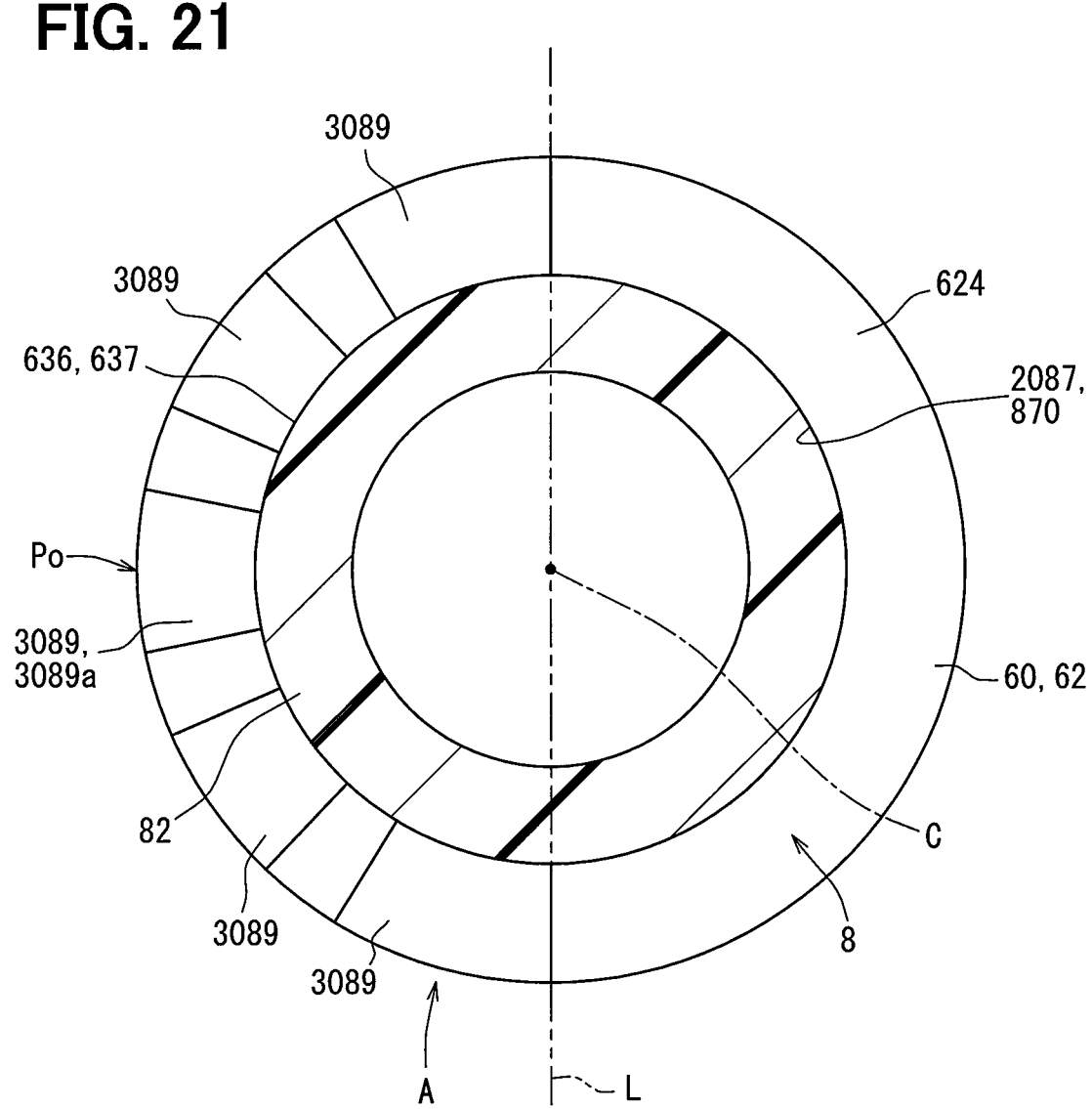
FIG. 21 is a cross-sectional view illustrating a modification of FIG. 15.

In the third modification related to the third embodiment, as shown in FIG. 20, the protrusions 3089 are provided in the specific area A, avoiding the opposite position Po opposite to the intermediate gear 635 through the rotation center line C in the radial direction. In the fourth modification of the third embodiment, as shown in FIG. 21, each of the protrusions 3089 is formed in an arc columnar shape, and has an inner peripheral portion along a virtual circle having substantially the same diameter as the inner diameter of the sliding support portion 870, under the adoption of the second radial bearing 2087 according to the second embodiment, to radially support the second outer peripheral straight portion 82 from the outer peripheral side.

Figure 22:
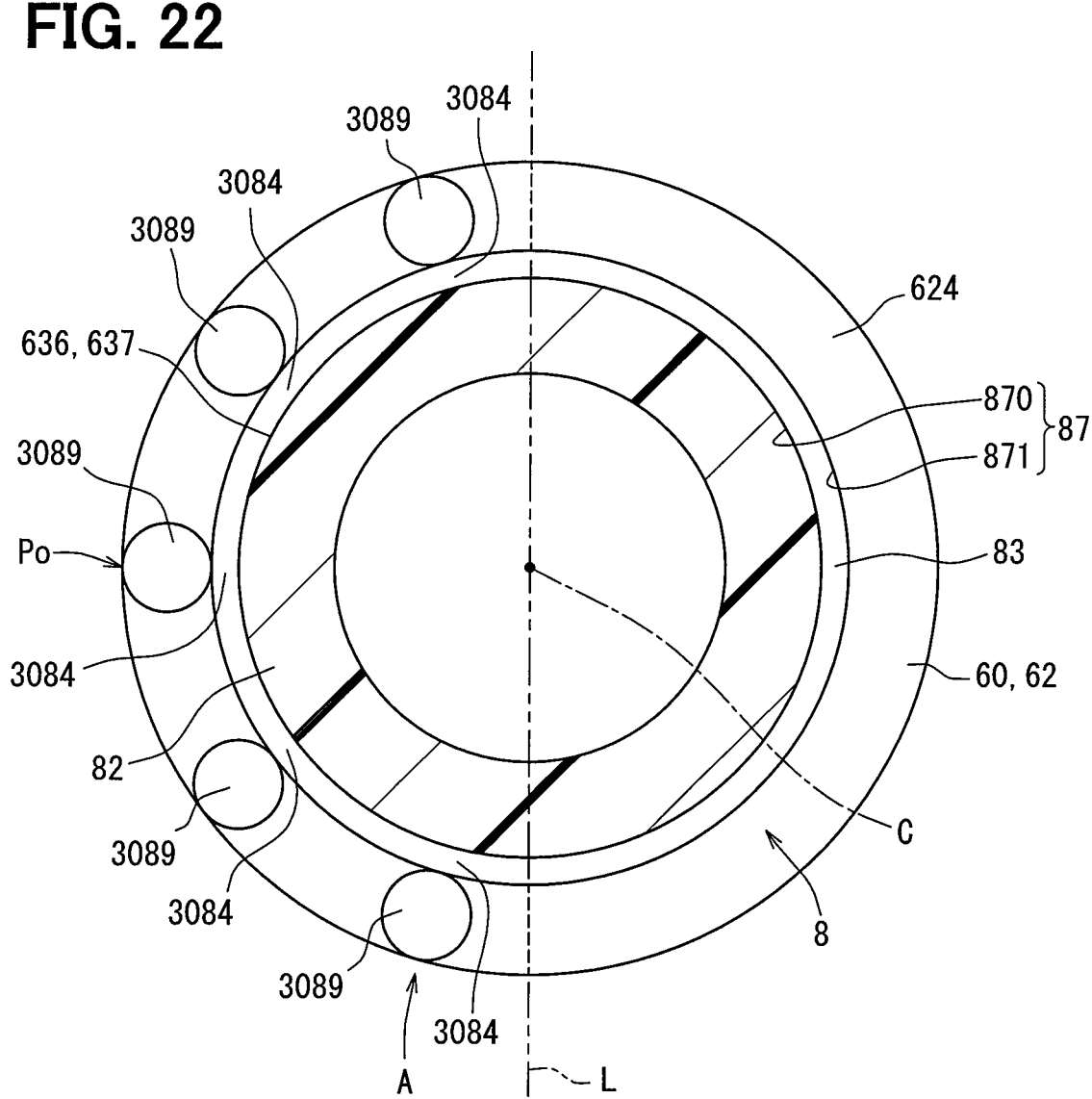
FIG. 22 is a cross-sectional view illustrating a modification of FIG. 15.
Figure 23:
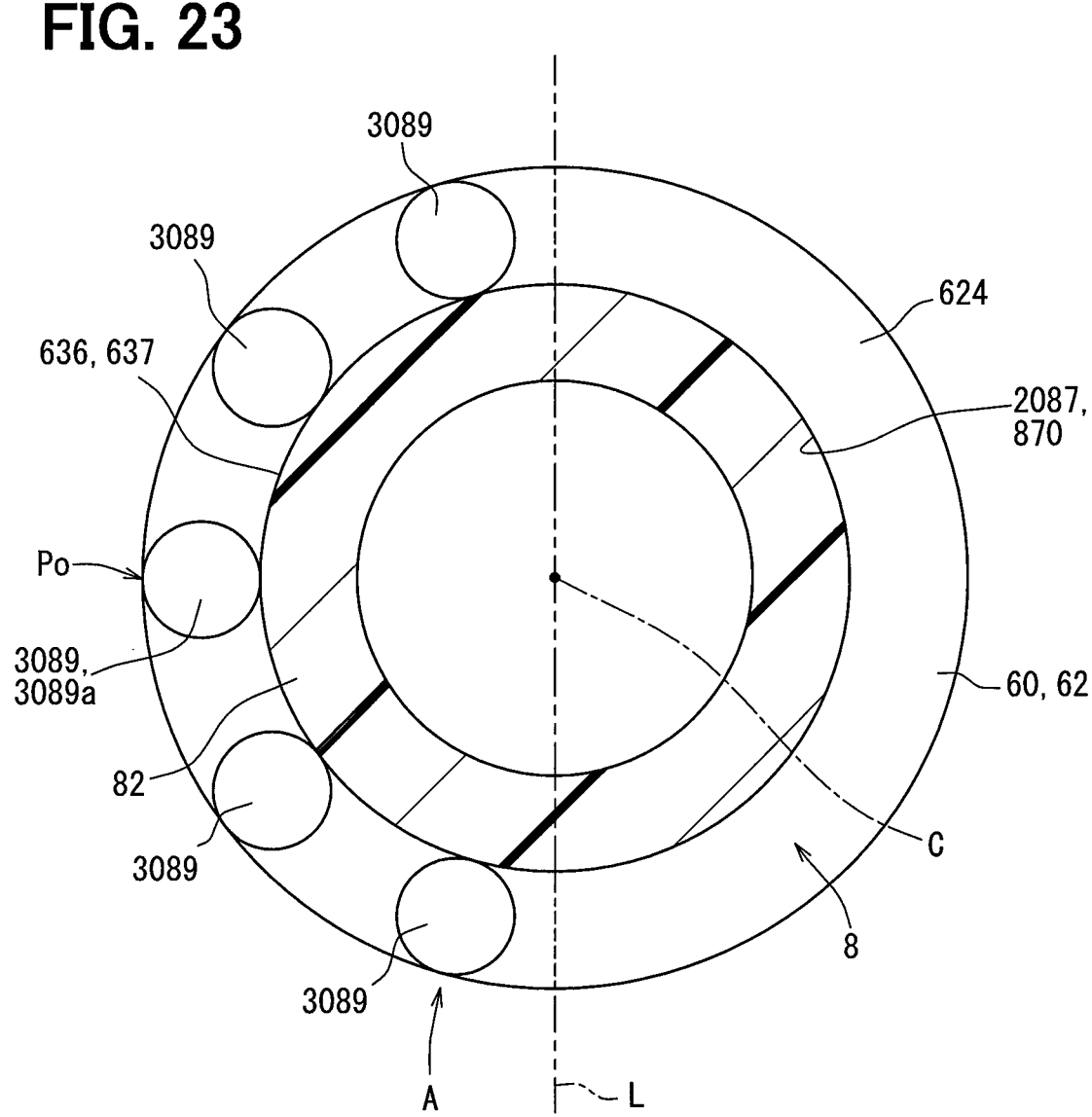
FIG. 23 is a cross-sectional view illustrating a modification of FIG. 15.

In the fifth modification of the third embodiment, as shown in FIG. 22, each of the protrusions 3089 is formed in a cylindrical pin shape or the like in contact with a virtual circle having substantially the same diameter as the inner diameter of the loosely insertion portion 871. A radial gap 3084 may be defined between the outer peripheral straight portion 82 and the protrusion 3089. In the sixth modification of the third embodiment, as shown in FIG. 23, each of the protrusions 3089 is formed in a cylindrical pin shape or the like in contact with the imaginary circle having substantially the same diameter as the inner diameter of the sliding support portion 870 under the adoption of the second radial bearing 2087 according to the second embodiment, to support the second outer peripheral straight portion 82 from the outer peripheral side.

In the seventh modification of the first to third embodiments, the present disclosure may be applied to a device other than the indicator instrument 1 for a vehicle, such as a head-up display (HUD), and the "rotating body" of the device may be rotationally driven by the step motor 6.

What is claimed is:

1. A step motor that rotationally drives a rotating body having a rotation shaft, comprising:
    an output gear having an output shaft formed in a cylindrical shape surrounding the rotation shaft to rotate around a rotation center line together with the rotating body, and a final gear extending radially outward from the output shaft;
    a radial bearing having an inner circumference side that radially supports the output shaft, on one side of the final gear in an axial direction;
    a reduction gear mechanism having a first reduction gear meshed with the final gear, and a second reduction gear meshed with the first reduction gear on the one side of the final gear in the axial direction; and
    a protrusion protruding from the radial bearing toward the other side in the axial direction, in a specific area extending from a longitudinal cross section of the output gear including the rotation center line to an opposite side away from the first reduction gear, wherein
    the protrusion is provided at least at a position, in the specific area, opposite to the first reduction gear through the rotation center line in a radial direction, and
    a radial gap is defined between the protrusion and the output shaft inserted in the radial bearing.

2. The step motor according to claim 1, wherein the protrusion is provided to spread over an entire area around the rotation center line in the specific area.

3. The step motor according to claim 1, wherein the protrusion is one of a plurality of protrusions provided dispersedly around the rotation center line in the specific area.

4. The step motor according to claim 1, wherein the protrusion radially supports an outer circumference side of the output shaft inserted in the radial bearing.

5. An indicator instrument for a vehicle comprising:
    the step motor according to claim 1; and
    a rotation indicator that indicates a vehicle state value as the rotating body.

6. The step motor according to claim 1, wherein the protrusion is provided within a range less than or equal to 180 degrees around the rotation center line in the specific area.

* * * * *